United States Patent
Abe et al.

(10) Patent No.: US 7,234,023 B2
(45) Date of Patent: Jun. 19, 2007

(54) DISK ARRAY SYSTEM AND FAULT-TOLERANT CONTROL METHOD FOR THE SAME

(75) Inventors: Shohei Abe, Odawara (JP); Azuma Kano, Odawara (JP); Ikuya Yagisawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 184 days.

(21) Appl. No.: 10/835,074

(22) Filed: Apr. 30, 2004

(65) Prior Publication Data

US 2005/0188247 A1 Aug. 25, 2005

(30) Foreign Application Priority Data

Feb. 6, 2004 (JP) .............................. 2004-030792

(51) Int. Cl.
- G06F 12/16 (2006.01)
- G06F 12/00 (2006.01)
- G06F 11/00 (2006.01)

(52) U.S. Cl. .............................. 711/114; 711/112; 714/5
(58) Field of Classification Search ..................... None
See application file for complete search history.

(56) References Cited

U.S. PATENT DOCUMENTS

| | | | | |
|---|---|---|---|---|
| 5,812,754 | A * | 9/1998 | Lui et al. ........................ 714/6 |
| 5,898,828 | A * | 4/1999 | Pignolet et al. ................. 714/6 |
| 6,504,817 | B2 * | 1/2003 | Oldfield et al. ............. 370/217 |
| 6,658,504 | B1 | 12/2003 | Lieber et al. |
| 6,725,394 | B1 | 4/2004 | Bolt |
| 6,898,730 | B1 | 5/2005 | Hanan |
| 6,915,381 | B2 | 7/2005 | Fujie et al. |
| 2001/0011357 | A1 * | 8/2001 | Mori ........................... 714/25 |
| 2003/0013557 | A1 | 1/2003 | Kennedy, III et al. |
| 2003/0135577 | A1 | 7/2003 | Weber et al. |
| 2004/0236908 | A1 | 11/2004 | Suzuki et al. |

* cited by examiner

Primary Examiner—Hyung Sough
Assistant Examiner—Craig E Walter
(74) Attorney, Agent, or Firm—Mattingly, Stanger, Malur & Brundidge, P.C.

(57) ABSTRACT

A disk array system where a plurality of SATA drive enclosures are connected through an FC loop is made capable of continuing to process data even in the event of a fault. When the system is normally operated, a first system controller and a second system controller execute read/write operations from and to disks of a SATA drive enclosure of a disk array via a first interface connector and a second interface connector, respectively, through the FC loop. When an error occurs on a second backend FC loop, the second system controller disconnects itself from the failed second backend FC loop and switches the path to a first backend FC loop which is normally functioning, to access the disk drive.

15 Claims, 16 Drawing Sheets

FIG.5A
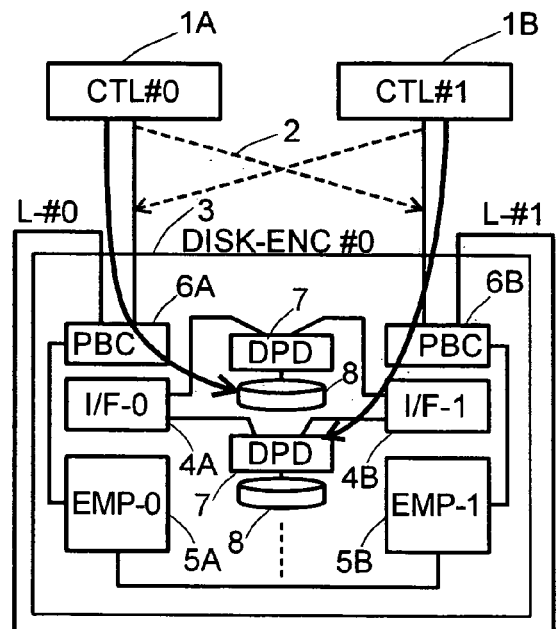
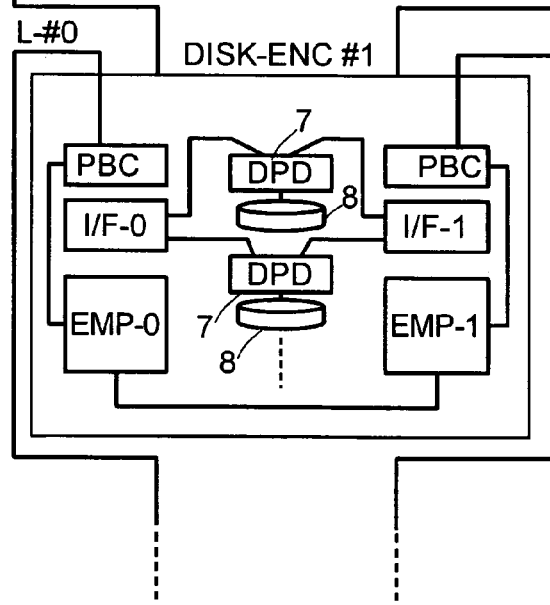
FIG.5B
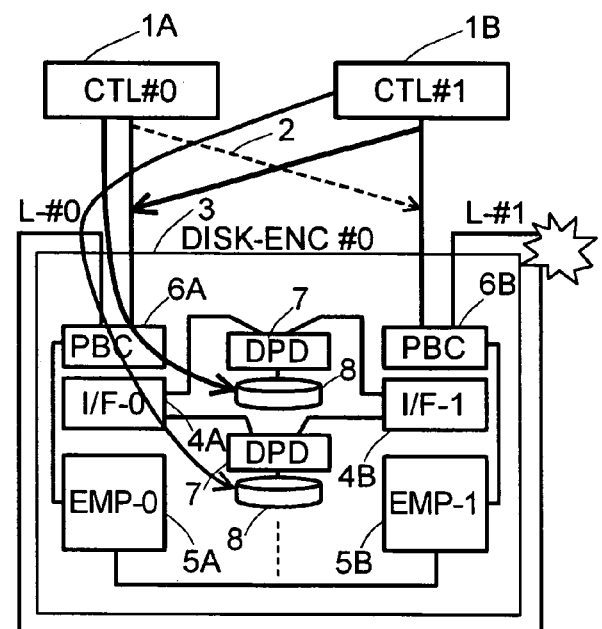
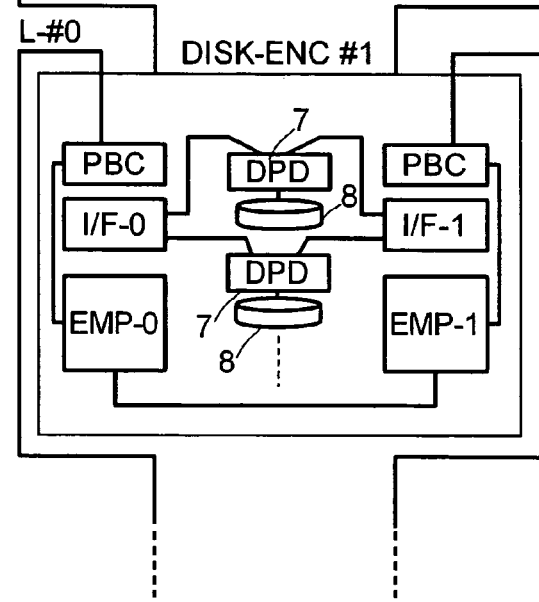

DISK ARRAY SYSTEM AND FAULT-TOLERANT CONTROL METHOD FOR THE SAME

CROSS-REFERENCE TO PRIOR APPLICATION

This application relates to and claims priority from Japanese Patent Application No. 2004-30792, filed on Feb. 6, 2004, the entire disclosure of which are incorporated herein by reference.

BACKGROUND OF THE INVENTION

1. Field of the Invention

The present invention relates to a disk array system, and particularly to a technique effectively applied to a disk array system where a plurality of disk components are connected by looped communication means such as a Fibre Channel loop and to a fault-tolerant control method for such a disk array system.

2. Description of Related Art

As an ultra high-speed gigabit network technology, there is known Fibre Channel standardized by ANSI NCITS T11 (formerly ANSI X3 T11). Utilization of such a Fibre Channel (FC) loop (hereinafter referred to as "FC loop") enables to build a large-scale storage system, i.e., a disk array system, where a plurality of hard disk units is connected.

On the other hand, a disk drive unit which performs read/write operations via serial interface, i.e., SATA (Serial Advanced Technology Attachment) drive, has been devised recently.

Patent document 1 discloses an information processing system employing SATA drives.

Patent Document 1: U.S. patent application Publication No. 2003/0135577

SUMMARY OF THE INVENTION

However, it is not easy to apply SATA drives to a disk array system. More specifically, application of SATA drives to a disk array system requires to address many issues, for instance, management of a plurality of enclosures in each of which is housed a SATA drive and connection between a SATA drive and a controller which controls read and write operations to and from the SATA drive.

An object of this invention is to solve the problems of the conventional art, and to provide a large-scale storage system employing SATA drives as a disk array system.

The invention provides a disk array system where a SATA drive is utilized as a hard disk unit (which may be referred to as "disk drive unit", "disk drive", or simply "drive") which constitutes a drive enclosure (i.e., disk drive enclosure) of a disk array system, and a plurality of such drive enclosures are connected via a dual FC loop. The disk array system is enabled to continue accessing a drive enclosure on the normal side or loop in the event of any error or fault in a drive enclosure or SATA drive on one of the two FC loops, by identifying the failed drive enclosure or SATA drive where the error occurs and then isolating the failed drive enclosure from the FC loop, so that discrepancy in controls by a controller (hereinafter referred to as system controller) and by drive controllers housed in respective drive enclosures is avoided.

In the disk array system employing SATA drives where the FC loop is dual, when the disk drive of the failed drive enclosure is isolated from or bypassed by the FC loop, there is a possibility that malfunction such as a firmware crash or a latent bug takes place at an interface connector, unless the drive controller of the failed drive enclosure is also shutdowned. Further, because of the discrepancy between detections of the error by the drive controller of the drive enclosure and by the system controller housed in a system controller enclosure, the system controller may shutdown the drive controller of the drive enclosure on the normal side or loop when a path is about to be switched from the drive controller of the drive enclosure on the failed side or loop to the drive controller on the normal loop, consequently leading to a system down.

Further, in a case where the drive controller of the drive enclosure on the failed loop can not be isolated, that is, where a loop failure takes place, the failed drive enclosure is not disconnected from the system, and therefore communication between the system controller and each drive enclosure through the FC loop can not be maintained.

Specifications of FC loop is designed such that communication between a system controller and each disk drive on an FC loop is disabled even if the FC loop is disconnected merely at one point.

To deal with the above-described situation, the invention provides a storage system (which may be simply referred to as "system" hereinafter) constituted by a disk array of SATA drives built with utilizing an FC loop, in which it is controlled such that when the disk drives are individually isolated from the FC loop, the path is switched by a device such as a port bypass circuit (PBC), so that the FC loop is not disrupted.

A disk array system is built such that a plurality of drive enclosures each housing a disk drive and a controller which controls the disk drive (hereinafter referred to as "drive controller") and a system controller enclosure accommodating a system controller which controls an entirety of the plurality of the drive enclosures, are connected by utilizing an FC loop. A drive enclosure to be added may be referred to as expansion enclosure. In such a disk array system, where a fault occurs in a particular drive enclosure, the PBC operates to isolate the drive enclosure where the fault (which may be referred to as "error" hereinafter) occurs, in order to have other drive enclosures continue to operate. However, in a case where the FC loop is disrupted or the communication through the FC loop is interrupted for some reason, all drive enclosures connected to the FC loop is disabled.

According to the invention, to deal with the fault occurrence in the large-capacity storage system where the system controller enclosure and plurality of drive enclosures are connected through an FC loop, the FC loop is made dual so that where a fault occurs on one loop, the communication can be maintained by using the other loop and the drive enclosure where the error takes place is identified and isolated from the FC loop.

Further, according to the invention, an interface connector for converting an FC loop data into a data which the SATA drive can read/write is provided to connect the controller of each drive enclosure (i.e. drive controller) to the FC loop. When an error occurs in one of the plurality of drive enclosures, in response to an instruction from the drive controller (which may be called RAID controller) on the failed side or loop or from the drive controller on the normal side or loop of the failed drive enclosure, the drive controller on the failed side or loop is powered off or reset.

Further, according to the invention, a port bypass circuit (PBC) is provided between each interface connector and an FC loop, to prepare against an occurrence of a failure in any drive controller. The provision of the port bypass circuit enables isolation of the failed component from the FC loop, such that the failed drive enclosure and the following enclosures are bypassed by the FC loop, or alternatively, only the failed drive enclosure is bypassed by the FC loop.

In other words, the invention is directed to disk drives and drive controllers as constituent units of a disk array system (storage system). A drive enclosure is constituted with a drive controller being dualized. The dualized drive controller is controlled by a master enclosure (which may be referred to as RAID controller) in the form of a controller enclosure housing two system controllers for controlling the dualized drive controller. The drive enclosures and the system controllers are connected in two loops or two subsystems by using a communication line which may be Fibre Channel to obtain an FC loop through which data is communicated between the system controllers and the drive enclosures. There is provided the above-described port bypass circuit (PBC) which individually controls to connect and disconnect the drive enclosure to and from the system controllers through the FC loop. The port bypass circuit (PBC) merely operates to bypass a port in accordance with presence/absence of a signal, and the control is actually performed by the system controllers.

As described above, the disk array system according to the invention comprises at least one controller enclosure housing two system controllers, a plurality of drive enclosures, and a plurality of FC loops which connects the at least one controller enclosure and the plurality of drive enclosures.

The controller enclosure comprises at least: a communication controller connected to a higher-level device such as a host computer and receives data from the higher-level device, a cache memory which is connected to the communication controller and which holds data communicated between the communication controller and the higher-level device, and a control portion which is connected to the communication controller and the cache memory and which controls to transfer or receive the data communicated between the communication controller and the higher-level device, to and from the communication controller, through an FC loop.

Each of the disk drive enclosures houses a SATA drive connected to: a plurality of port bypass circuits (PBCs) which is connected to the FC loops and switches a connection to the controller enclosure; a plurality of interface connectors which is connected to the controller enclosure through the plurality of FC loops, and each of which connects a fiber channel interface which is used by the plurality of FC loops and an interface for the SATA drive; a plurality of dual port switch device which are connected to the plurality of interface connectors, respectively, and controls to switch a path to the SATA drive from the plurality of interface connectors; and a plurality of dual port switch circuits, and the SATA drive receives and stores the data transferred from the controller enclosure via the FC loops, the port bypass circuits, interface connecting circuits, and the dual port switch circuits.

Each of the two drive controllers housed in each dual-structured drive enclosure has an enclosure management processor which monitors operation of the each drive enclosure. This enclosure management processor is assigned with an address of Fibre Channel, namely, FC-AL address or ALPA (Arbitrated Loop Physical Address).

In the above-described structure, an enclosure management processor (first processor) communicates with the other enclosure management processor (second processor) housed in the same enclosure, and in a case where the first processor recognizes an occurrence of an error in a drive controller monitored by the second processor, the first processor notifies the system controller of the fact. The system controller shuts down operation of the failed drive enclosure in response to the notification.

The invention can provide a disk array system to which a SATA drive is applied.

It is to be understood that the present invention is not limited to details as described above or of embodiments described below, but may be embodied with various modifications, without departing from the scope and spirit of the invention as defined in the attached claims.

BRIEF DESCRIPTION OF THE DRAWINGS

FIG. 5 is a pattern diagram illustrating a basic concept of a fault-tolerant control method for a disk array system according to a first embodiment of the invention;

DETAILED DESCRIPTION OF THE PREFERRED EMBODIMENTS

There will be described in detail presently preferred embodiments of the invention by reference to the accompanying drawings. First, structure of a disk array system 10 according to the invention will be described.

Figure 1A:
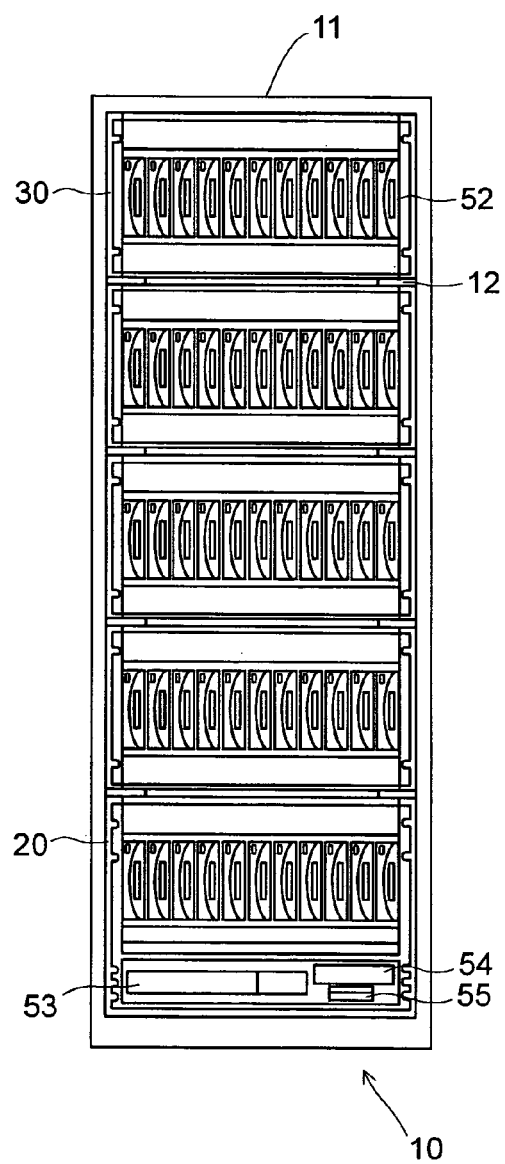
FIG. 1 is an external view of an entirety of a disk array system according to the invention.
Figure 1B:
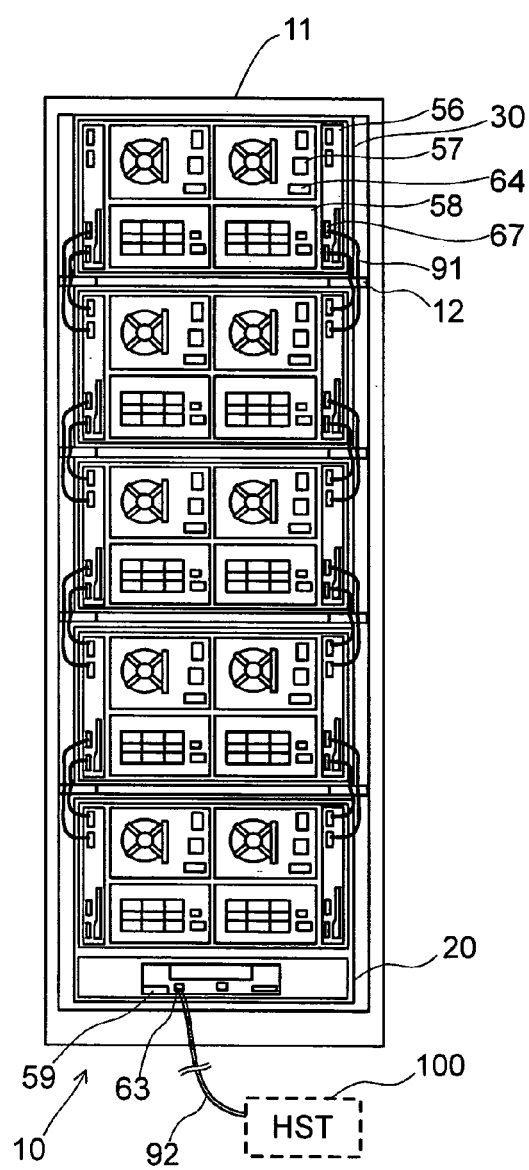
Figure 2A:
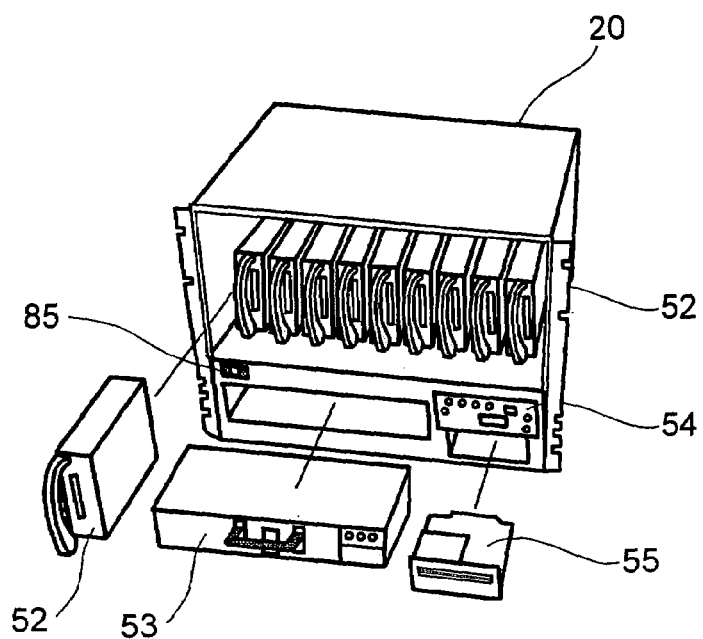
FIG. 2 is an explanatory view showing structure of a master enclosure indicated in FIG. 1.
Figure 2B:
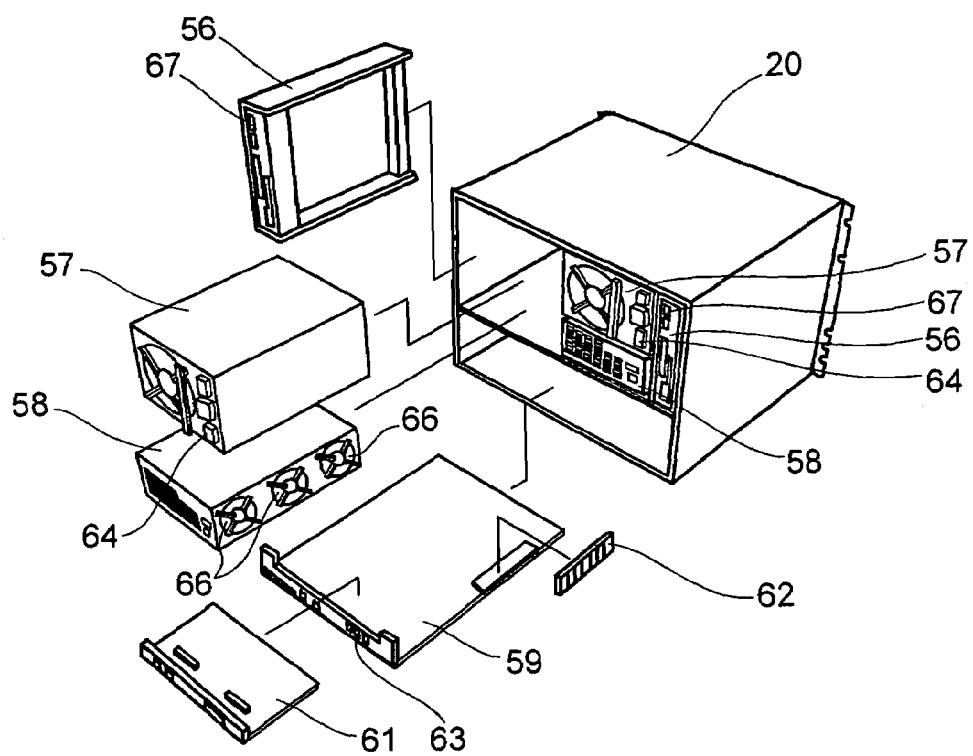
Figure 3A:
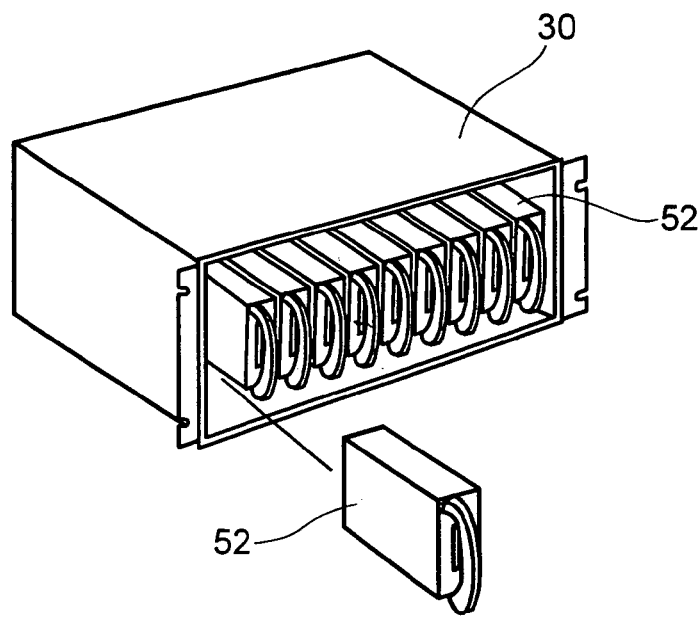
FIG. 3 is an explanatory view showing structure of an expansion enclosure indicated in FIG. 1.
Figure 3B:
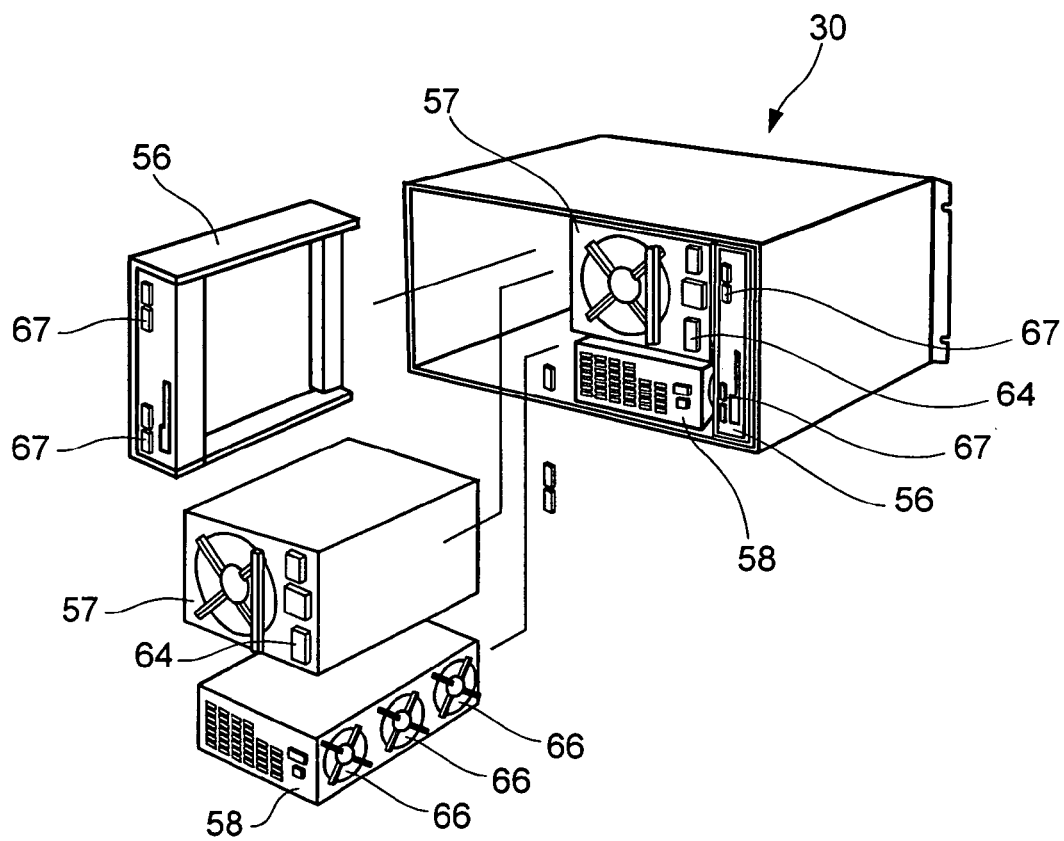
Figure 4:
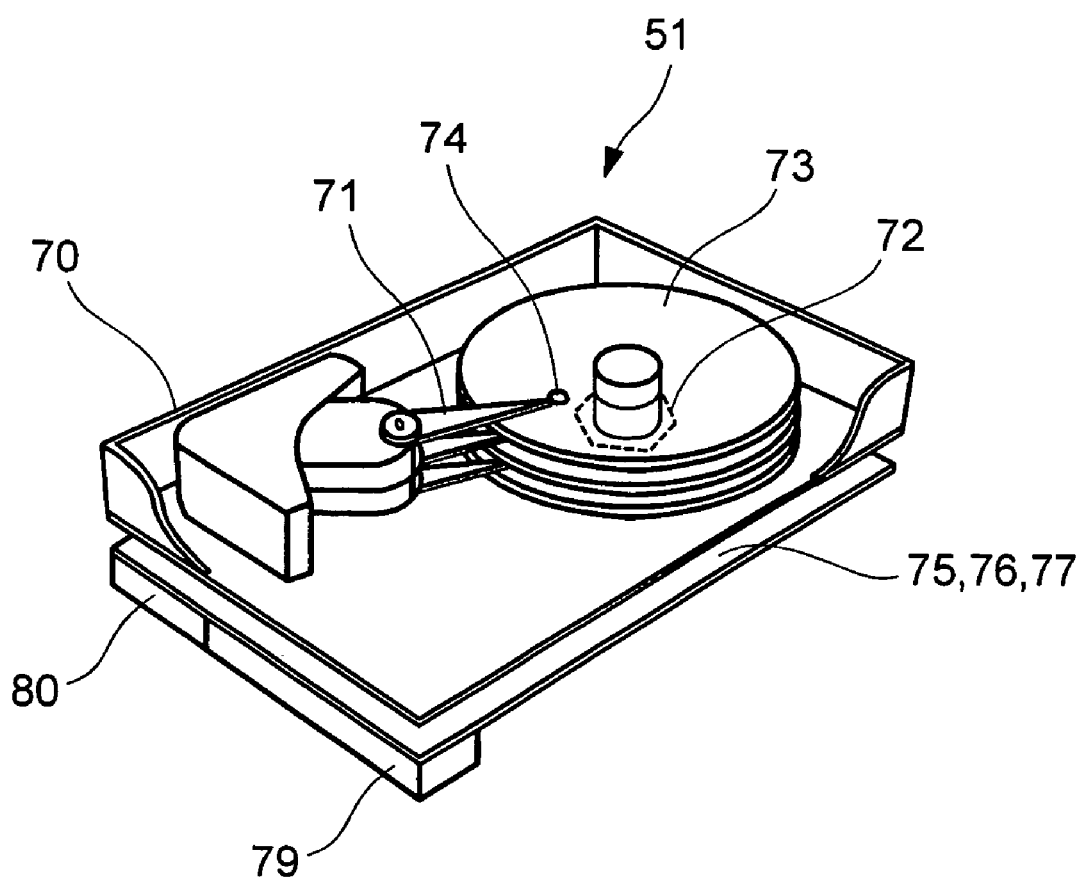
FIG. 4 is an explanatory view illustrating an example of disk drive unit shown in FIGS. 2 and 3.

FIG. 1 is an overall view of the disk array system 10; FIG. 1A is a front view, while FIG. 1B is a back view thereof. FIGS. 2A and 2B are views illustrating structure of a master enclosure indicated in FIG. 1, and are respectively a perspective front and back views of the master enclosure where part of its components is pulled out. FIGS. 3A and 3B are views illustrating structure of an expansion enclosure indicated in FIG. 1, and are respectively a perspective front and back views of the expansion enclosure where part of its components is pulled out. FIG. 4 is a view for illustrating an example of structure of a disk drive unit indicated in FIGS. 2 and 3.

As shown in FIG. 1A, the disk array system 10 has a plurality of additional units 12 installed on a rack frame 11. On the additional units 12 are mounted a master enclosure 20 and expansion enclosures 30, such that these enclosures are capable of being pulled out like draw-outs. In FIG. 1, reference numerals 52, 53, 54, and 55 respectively denote a disk drive unit on which is loaded a disk drive 51 as shown in FIG. 4, a battery unit as a backup power source, a display panel including a display device such as LED lamps for indicating an operating condition of the disk drive 51 and others, and a flexible disk drive which may be used when a maintenance program is loaded, for instance.

As shown in FIG. 1B, on the back face of the rack frame 11 are disposed power controller boards 56 of the respective enclosures. On each board is mounted, for example, a PBC (port bypass circuit) for controlling an FC loop between a plurality of the disk drives 51, a circuit for monitoring status of an AC/DC power source 57 and temperatures of parts of the master enclosure and expansion enclosures, and a circuit for controlling power supply to the disk drive 51, operation of a cooling fan 66 (shown in FIGS. 2 and 3), and the display device on the display panel 54.

On the power controller board 56 is further provided a connector 67 for an FC cable 91. In FIG. 1, reference numerals 48, 49, 58, 59, 63 and 92 respectively denote a control line, power supply line, cooling fan unit, controller board, connector, and communication cable connected to one or more higher-level devices, i.e., host computers 100.

As shown in FIG. 2A, on the master enclosure 20 are loaded a multiplicity of the disk drive units 52 such that each disk drive unit 52 is capable of being pulled out like a draw-out. Under the disk drive units 52 of the master enclosure 20, the battery unit 53 and flexible disk drive 55 are accommodated and the display panel 54 is mounted.

As shown in FIG. 2B, on the back face of the master enclosure 20 is disposed the power controller board 56 for controlling power supply to the plurality of disk drives 51. On the power controller board 56 is provided the connector 67 to which is connected the FC cable as part of an FC loop. Further, on the back face of the master enclosure 20 is mounted the AC/DC power source 57 for supplying electricity to parts of the master enclosure. The AC/DC power source 57 is connected to the power controller board 56. Reference numeral 64 denotes a breaker switch. Under the AC/DC power source 57 is disposed the cooling fan unit 58 having the cooling fan 66. There is mounted the controller board 59 also on which is mounted an interface board 61. The controller board 59 has a cache memory 62 and the connector 63 for the communication cable connected to the higher-level device (host computer) 100. In FIG. 1, only a single higher-level device is shown.

To be connected to the host computer 100, the connector 63 of the interface board 61 is compliant with interface standards, for example, SAN (Storage Area Network) consisting of protocols such as Fibre Channel (FC) and Ethernet (registered trademark), LAN (Local Area Network), and SCSI.

On the front side of the expansion enclosure 30, multiple disk drive units 52 are loaded such that each unit 52 is capable of being pulled out like a draw-out, as shown in FIG. 3A. On the backside of the expansion enclosure 30, a power controller board 56, an AC/DC power source 57, and a cooling fan unit 58, similar to those as shown in FIG. 2 are disposed.

As shown in FIG. 4, the disk drive 51 constituting with other members the disk drive unit 52 in each master and expansion enclosure 20, 30 has a housing 70 in which is incorporated a magnetic disk (hard disk) 73, an actuator 71, a spindle motor 72, a magnetic head 74 which performs read/write operations, a control circuit 75 for controlling elements including the magnetic head 74, a signal processing circuit 76 for controlling data-read/write signals, a communication interface circuit 77, an interface connector 79 through which various commands and data are input/output, and a power connector 80.

The disk drive 51 may be a magnetic disk of CSS (contact start stop) system having a nominal size of 3.5-inch, or of load/unload system having a nominal size of 2.5-inch, and has a communication interface for serial ATA (SATA), for example. In the following description, a disk array system employing SATA drives as disk drive units is illustrated.

FIG. 5 is a pattern diagram illustrating a basic concept of a fault-tolerant control method for the disk array system according to the first embodiment of the invention, and shows a fundamental control method of switching an access path in the event of a fault or error in one of two sub-systems of a dual-structured SATA drive enclosure. FIG. 5A indicates an access path when the system is normally operated, while FIG. 5B indicates that when the fault occurs. In FIGS. 5A and 5B, reference numerals 1A and 1B respectively denote a first system controller CTL#0 and a second system controller CTL#1.

Reference numerals 2 and 3 respectively denote a backend (which connects the system controllers and the drive controllers) and a SATA drive enclosure DISK-ENC#0 as an expansion component of the disk array. DISK-ENC#1 denotes an expansion drive enclosure. Reference numerals 4A and 4B denote a first interface connector I/F-0 and a second interface connector I/F-1, respectively, while reference numerals 5A, 5B denote a first drive enclosure management processor EMP-0, and a second drive enclosure management processor EMP-1. Reference numerals 6A, 6B respectively denote a port bypass circuit (PBC), and reference numerals 7 and 8 denote a dual port circuit (dual port device DPD) and a SATA disk, respectively. L-#0, L-#1 denote a first backend FC loop and a second backend FC loop.

The first system controller (CTL#0) 1A is connected thorough the backend FC loop L-#0 to the SATA drive enclosure (DISK-ENC#0), expansion enclosure DISK-ENC#1 and the following expansion enclosures, while the second system controller (CTL#0) 1B is connected thorough the backend FC loop L-#1 to the SATA drive enclosure (DISK-ENC#0), expansion enclosure DISK-ENC#1 and the following expansion enclosures. The first drive enclosure management processor (EMP-0) 5A (which will be simply referred to as "first management processor") is connected to the first interface connector (I/F-0) 4A via the port bypass circuit (PBC) 6A, while the second drive enclosure management processor (EMP-1) 5B (which will be simply referred to as "second management processor") is connected to the second interface connector (I/F-1) 4B via the port bypass circuit (PBC) 6B. The SATA disk 8 is connected to the first and second interface connectors (I/F-0, I/F-1) 4A, 4B via the dual port circuit (DPD) 7. It is to be noted that, similarly to the disk drives, the management processors are also assigned with respective Arbitrated Loop Physical Addresses (AL-PA) of Fibre Channel. These addresses are used when devices such as the system controllers access the management processors.

While the whole system is normally operated, as shown in FIG. 5A, the first and second system controllers (CTL#0, CTL#1) 1A, 1B communicate with, and read/write data from and to, the disk 8 as a component of the disk array, through the backend 2, and then via the port bypass circuits 6A, 6B, first and second interface connectors (I/F-0, I/F-1) 4A, 4B, and dual port circuit 7 of the SATA drive enclosure (DISK-ENC#0) 3. This state is indicated by a bold arrow in FIG. 5A.

Here, a specific case where an error has occurred on the second backend FC loop L-#1 is discussed. In this case, the second management processor (EMP-1) 5B switches the path of a path controller connected to the disk drive. Further, the second system controller (CTL#1) 1B disconnects itself from the second backend FC loop #1 on which the error has occurred, and switches to the normally performing first backend FC loop #0, to access the disk drive. Thus, even where the error has occurred on the backend FC loop, the access to the disk drive is continued.

There will be described in further detail embodiments of the invention based on the above-described fundamental fault-tolerant control method.

[First Embodiment]

Figure 6:
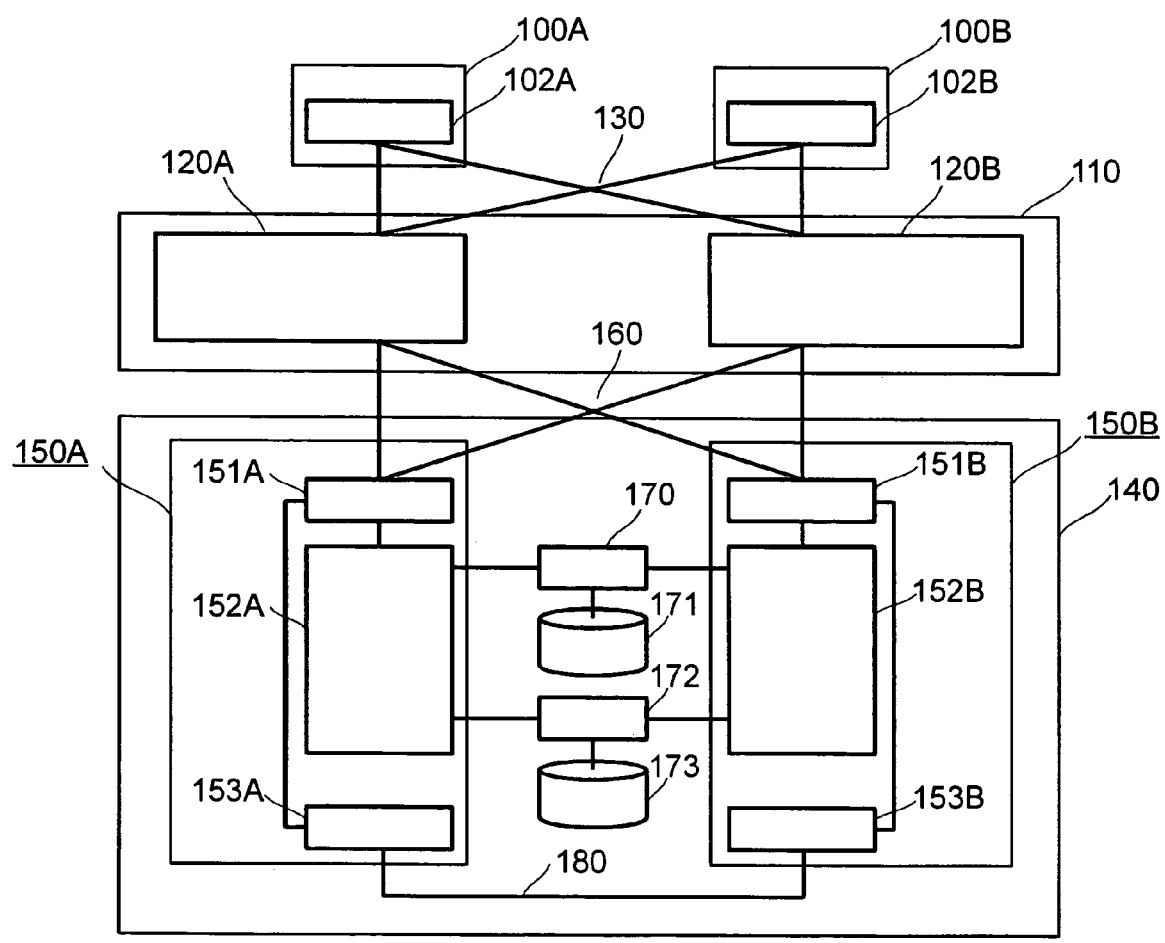
FIG. 6 is a functional block diagram illustrating structure of the disk array system according to the first embodiment.
Figure 7:
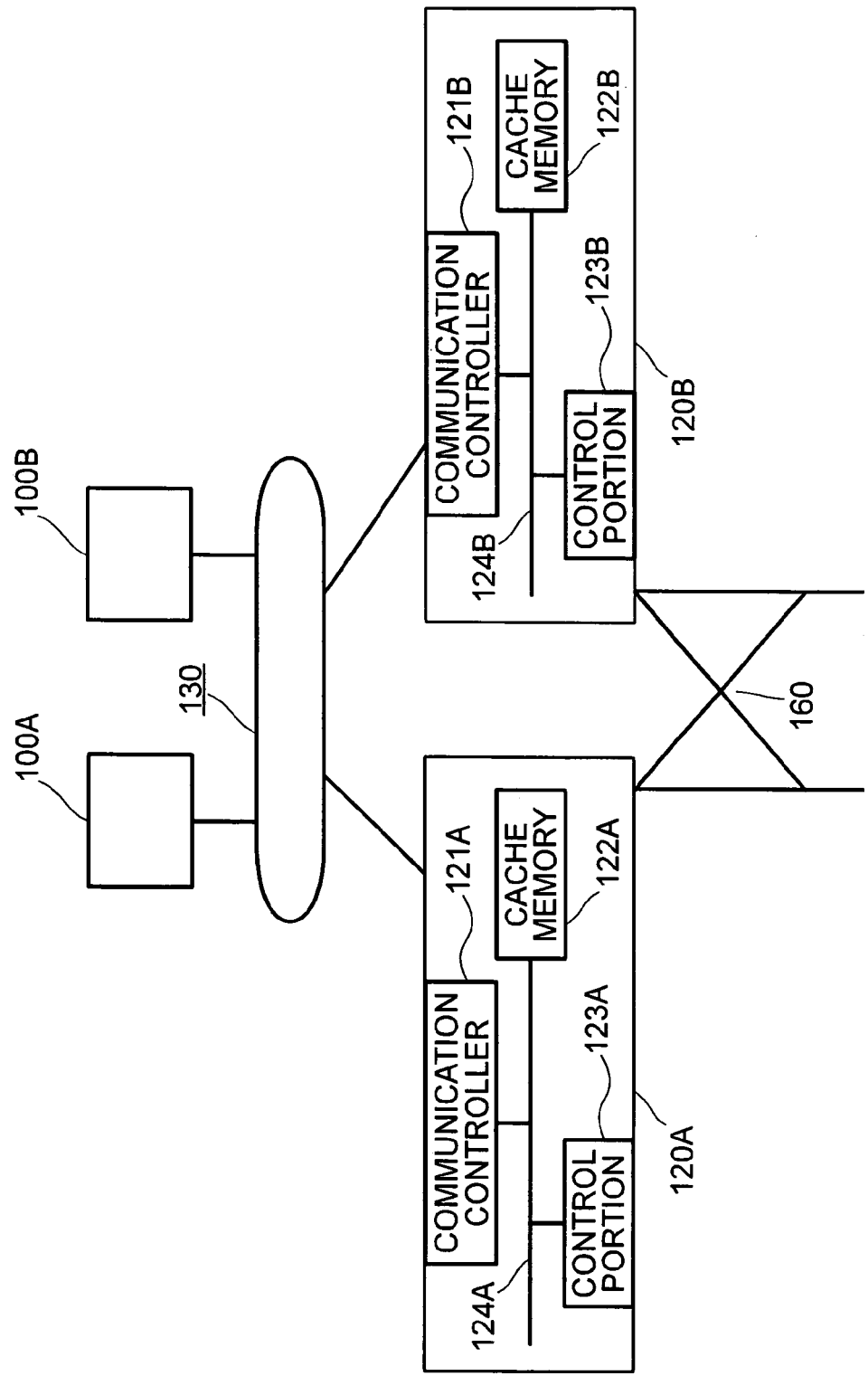
FIG. 7 is a functional block diagram illustrating an example of internal structure of a system controller as indicated in FIG. 6.

FIG. 6 is a functional block diagram illustrating structure of a disk array system according to the first embodiment, while FIG. 7 is a functional block diagram illustrating internal structure of a system controller indicated in FIG. 6. The disk array system has a master enclosure 110 and an expansion enclosure 140. The master enclosure 110 has two system controllers 120A, 120B for controlling the disk array system or storage system. The system controller 120A, 120B is a so-called RAID (Redundant Arrays of Inexpensive Disks) controller. The master enclosure 110 is connected to the higher-level devices in the form of host computers 10A, 10B, which may be PC servers, through a SAN (Storage Area Network) 130. The host computer 100A, 100B has an FC/SCSI interface board in the form of a host adapter 102A, 102B. The master enclosure 110 and expansion enclosure 140 are connected by a backend FC loop 160.

The expansion enclosure 140 is a drive enclosure and a plurality of which is actually disposed as shown in FIG. 1, although only one of them is shown in FIG. 6. The expansion enclosure 140 may be referred to as "drive enclosure" also. The expansion enclosure 140 has disk drives 171, 173 each constituted by a SATA drive. A drive controller for the disk drives 171, 173 is dual-structured, consisting of two drive controllers, namely, a first drive controller 150A and a second drive controller 150B. The first drive controller 150A is a controller for controlling the drive enclosure, i.e., drive controller, and has a first port bypass circuit 151A, a first interface connector 152A, and a first enclosure management processor 153A.

On the drive controller of the expansion enclosure is mounted an intelligent semiconductor chip (processor). This means that the system has two command channels, namely, one originating from the system controller and the other from the drive controller. Accordingly, in the event of occurrence of an error at the interface connector of the drive controller, there may be caused an unexpected crash of the chip or malfunction thereof due to a latent bug, since the chip is intelligent. To prevent an influence of the malfunction on the whole system, the failed interface connector is reset or powered off to be completely shut down. Thus the possible malfunction is prevented.

The first interface connector 152A of the drive controller 150A has a function to convert data of FC format which is transmitted on the FC loop, into SATA format. The same applies to the second drive controller 150B. The first and second enclosure management processor 153A, 153B is a processor for monitoring and managing the status of the drive enclosure 140 (e.g., power failure, abnormal temperature, and abnormal path). The first and second enclosure management processors 153A, 153B are connected via an exclusive line 180 to send respective management information to each other. The first and second enclosure management processors 153A, 153B are respectively connected to the first and second port bypass circuits 151A, 151B, and are assigned with respective FC-AL addresses.

The SATA drive comprises disks 171, 173 and dual port circuits or DPDs 170, 172. The dual port circuit 170, 172 has a function to switch the access path to the disk 171, 173 between the first interface connector 152A of the first drive controller 150A and the second interface connector 152B of the second drive controller 150B. In other words, the dual port circuit 170, 172 has a function to connect one of a data line from the first interface connector 152A of the first drive controller 150A and a data line from the second interface connector 152B, of the second drive controller 150B to the disk 171, 173.

The first and second port bypass circuits 151A, 151B are circuits for switching the path (or data line). However, these circuits do not perform the switching of the path for themselves, but implement it in response to an instruction from the system controller 120A, 120B.

For instance, the system controller 120A in FIG. 6 is constituted as shown in FIG. 7. That is, the system controller 120A includes a communication controller 121A having an interface which handles communication with the host computers 10A, 10B, and a cache memory 122A which temporarily holds data communicated between the communication controller 121A and a control portion 123A. Reference numeral 124A denotes a data bus. The control portion 123A implements write and read operations to and from the drive (disk) via the cache memory 122A in accordance with a request for data input/output. The same applies to the system controller 120B.

Figure 8:
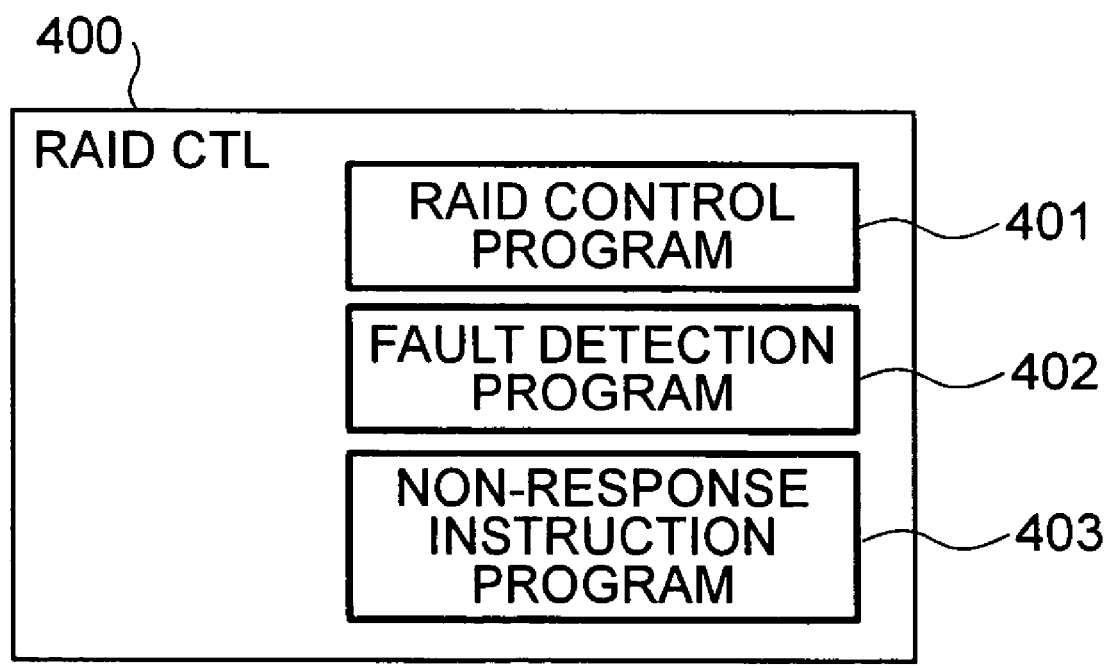
FIG. 8 indicates control programs stored in a RAID controller of the master enclosure.

FIG. 8 is an explanatory view indicating control programs in a RAID controller 400 included in the master enclosure 110. The RAID controller (RAID CTL) 400 has a RAID control program 401 as a base program for controlling the whole system, a fault detection program 402 for detecting a fault or error in the whole system, and a non-response instruction program 403 for shutting down the drive controller (250A or 250B) where the fault has occurred and confirming whether the failed drive controller is actually shut down.

By reference to FIGS. 9 and 10, there will be described operation of the disk array system constructed as described above, where an abnormality occurs in one of the two drive controllers of any of the expansion enclosures and thus it is determined that an error has occurred in the system. In the following description, only one side of dual elements or only one sub-system of dual system is illustrated, with exception of elements particularly requiring illustration, for avoiding redundancy. However, it is to be understood that the other side or sub-system operates in the similar manner. The same applies to the description of second through fourth embodiments of the invention.

Figure 9:
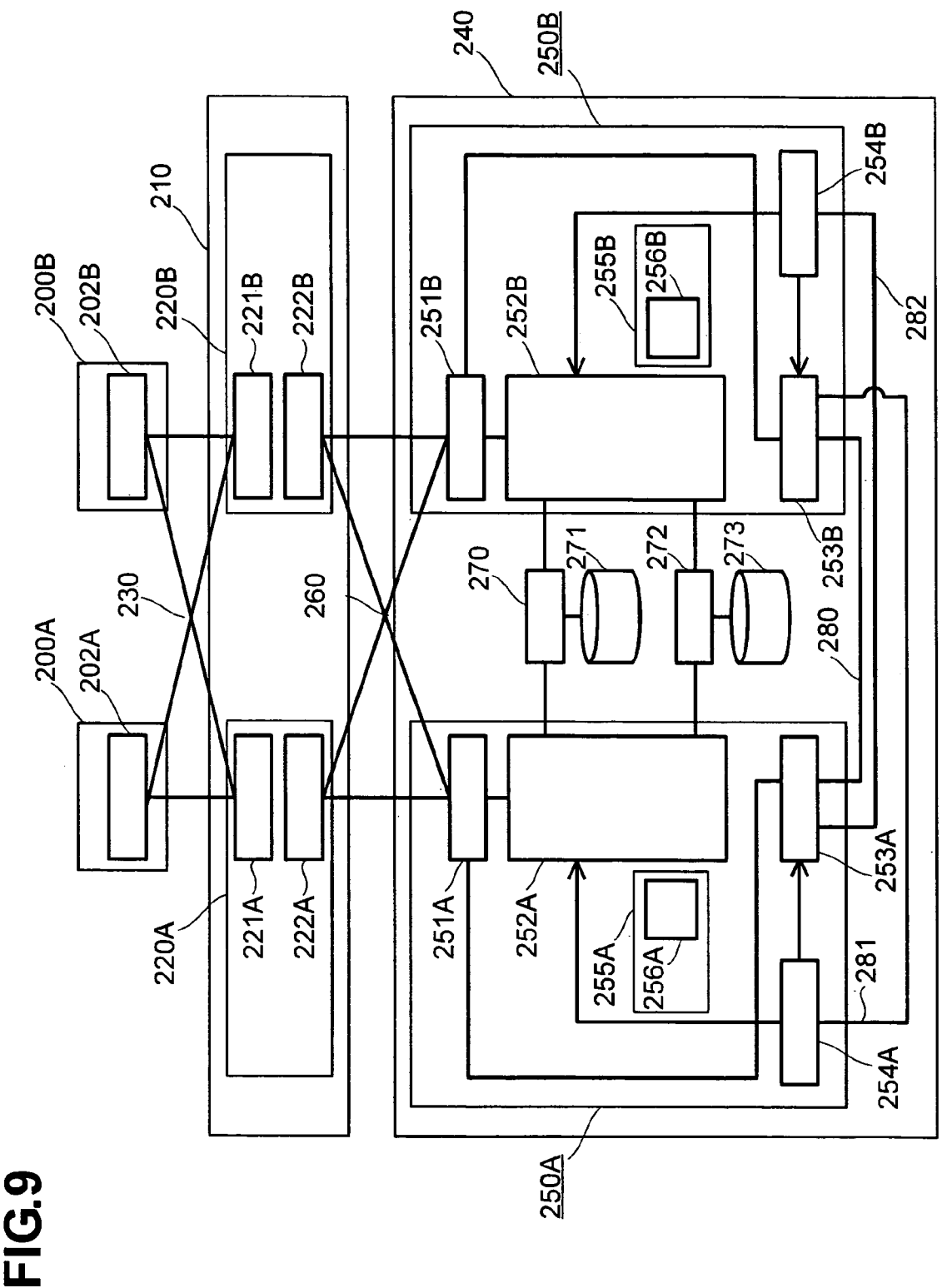
FIG. 9 is a functional block diagram illustrating in further detail the disk array system according to the first embodiment shown in FIG. 6.

FIG. 9 is a functional block diagram illustrating in further detail the structure of the disk array system according to the first embodiment shown in FIG. 6. FIG. 10 is a flow chart illustrating operation of the disk array system of FIG. 9. The structure shown in FIG. 9 is basically the same as that of FIG. 6, but FIG. 9 additionally shows functional elements essential in this embodiment. In FIG. 9, elements corresponding to the same elements denoted by reference numerals in the 100 range in FIG. 6 are denoted by the reference numerals in the 200 range. Regarding a master enclosure 210, it is shown in FIG. 9 that a system controller 220A has a host interface 221A and a path switch 222A. A first drive controller 250A has a reset circuit 254A for resetting or powering off the interface connector and the enclosure management processor of a failed drive controller.

Reference numeral 282 denotes a signal line for transferring a signal from a reset circuit 254B, for resetting or powering off an enclosure management processor 253A of the first drive controller 250A. The first and a second drive controllers 250A, 250B respectively have a memory 255A, 255B in which is stored an enclosure-management-processor control program 256A, 256B. The enclosure management processors 253A, 253B are connected to a first port bypass circuit 251A and a second port bypass circuit 251B, respectively, and are assigned with respective FC–AL addresses.

Figure 10:
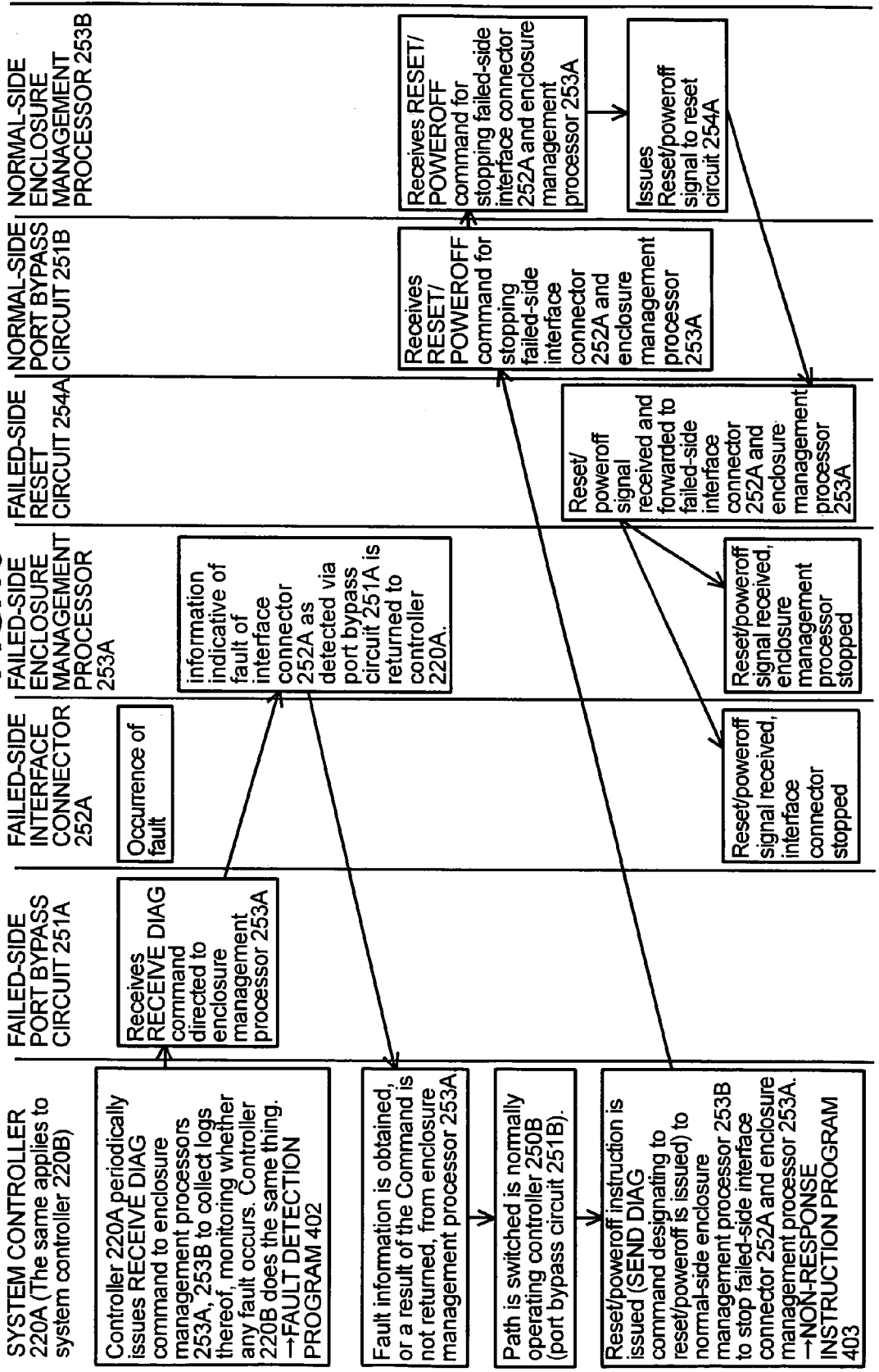
FIG. 10 is a flow chart illustrating operation of the system shown in FIG. 9.

FIG. 10 is a flow chart illustrating operation of the system shown in FIG. 9. In the structure shown in FIG. 9, the enclosure management processors 253A, 253B are directly connected to the port bypass circuits 251A, 251B, respectively. In FIG. 10, it is indicated that the port bypass circuit 251B which is on the normal side or loop directly passes a RESET/POWEROFF command for resetting/powering off the enclosure management processor 253A to the enclosure management processor 253B, thereby having the reset circuit 254A transmit a reset/poweroff signal based on this command.

There will be now described a flow of processing performed when a fault occurs in the system constructed as shown in FIG. 9. Here is described for illustrative purposes a specific case where an abnormality (error) occurs in the first drive controller 250A of the expansion enclosure 240, and a shut-down instruction is issued by the first drive controller 250A. A similar processing may be performed in another case where the shut-down instruction is issued by the second drive controller 250B upon an occurrence such an of error, and also in a still another case where the drive controller where the abnormality occurs is the second drive controller 250B. In FIG. 10 is indicated from left to right respective operations of: the system controller 220A (220B); failed-side port bypass circuit 251A; failed-side interface connector 252A; failed-side enclosure management processor 253A; failed-side reset circuit 254A; normal-side port bypass circuit 251B; and normal-side enclosure management processor 253B, and the order of processings performed by these functional elements are indicated by arrows.

First, the system controller 220A periodically issues a RECEIVE DIAG command to the enclosure management processors 253A, 253B to collect logs thereof, to monitor whether any fault occurs, by executing the fault detection program 402 shown in FIG. 8. The system controller 220B operates similarly.

Here, an exemplar case where a fault occurs at the interface connector 252A is discussed.

The failed-side port bypass circuit 251A receives the RECEIVE DIAG command directed to the enclosure management processor 253A.

The interface connector 252A becomes unable to communicate. The failed-side enclosure management processor 253A, which has detected via the port bypass circuit 251A that the fault has occurred at the interface connector 252A, returns fault information indicative of this fact to the system controller 220A.

When the system controller 220A obtains the fault information from the enclosure management processor 253A, or, does not receive a response to the RECEIVE DIAG command, the system controller 220A switches the path to a normally operating controller 250B, and issues a reset/poweroff instruction to the normal-side enclosure management processor 253B to stop or shut down the failed-side interface connector 252A and enclosure management processor 253A, by executing the non-response instruction program 403 (issuance of a SEND DIAG command).

The normal-side port bypass circuit 251B receives the RESET/POWEROFF command for shutting down the failed-side interface connector 252A and enclosure management processor 253A.

The normal-side enclosure management processor 253B receives the RESET/POWEROFF command for shutting down the failed-side interface connector 252A and enclosure management processor 253A, and issues the RESET/POWEROFF command to the reset circuit 254A.

The failed-side reset circuit 254A receives the RESET/POWEROFF command, and transmits a reset/poweroff signal to the failed-side interface connector 252A and enclosure management processor 253A.

The failed-side enclosure management processor 253A receives the reset/poweroff signal and is shut down.

Similarly, the failed-side interface connector 252A receives the reset/poweroff signal and is shut down.

According to the processing sequence as described above, the drive controller (SATA drive) on the failed side or loop is isolated or bypassed with reliability. Therefore, the communication between the system controller and each drive enclosure through the FC loop can be maintained, without causing a system down.

According to the present embodiment, the provision of the enclosure management processor enables to quickly deal with the fault occurring in the SATA expansion enclosure. Further, since the system controller can read and write data from and to the SATA drive via the FC loop, PBC, and interface connector, a control of a large volume of data can be enabled in the disk array system. Still further, since the plurality of system controllers is connected to the SATA expansion enclosure through the plurality of FC loops, a highly fault-tolerant disk array system can be provided.

[Second Embodiment]

A second embodiment is arranged such that the path bypasses a drive controller of an expansion enclosure where a fault has occurred, and goes to the normal expansion enclosure, so that the data communication with the higher-level device can be continued.

Figure 11:
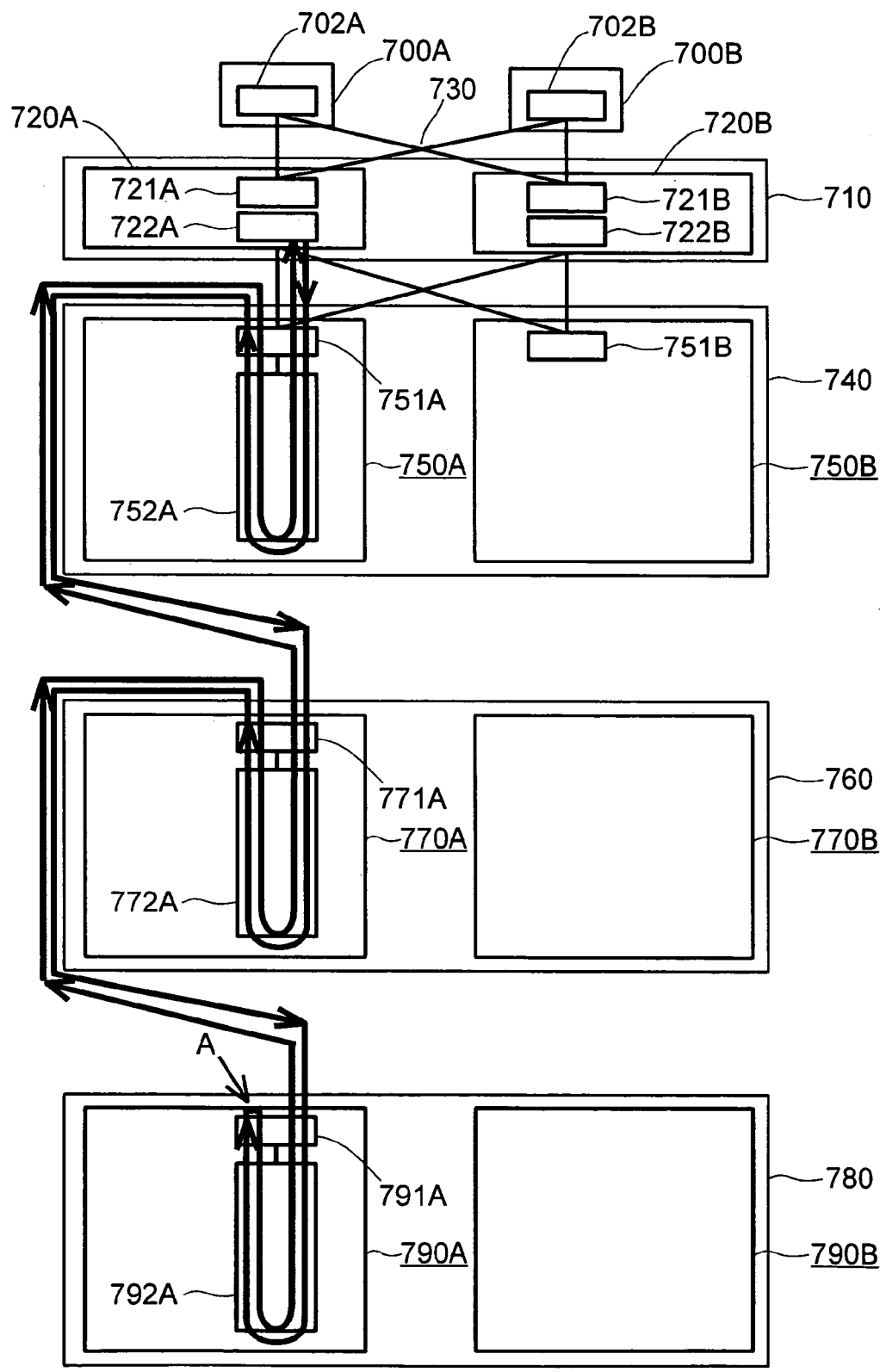
FIG. 11 is a functional block diagram illustrating a disk array system according to a second embodiment of the invention.

FIG. 11 is a functional block diagram illustrating structure of a disk array system according to the second embodiment, and shows a normally operated state of the disk array system comprising a master enclosure 710 and a plurality of expansion enclosures 740, 760, 780. Elements corresponding to the same elements in the above-described first embodiment are referred to by reference numerals in the 700 range. The master enclosure 710 comprises a dual-structured RAID controller, i.e., two system controllers 720A and 720B, which communicate with higher-level devices (e.g., host computers) 700A, 700B via host interfaces 721A, 721B, respectively. Further, the system controllers 720A, 720B have a path switch 722A, 722B, respectively.

The expansion enclosure 740 comprises a first drive controller 750A and a second drive controller 750B, which respectively have a port bypass circuit 751A, 751B. The first and second drive controllers 751A, 751B are connected to the path switches 722A, 722B of the system controllers 720A, 720B via the port bypass circuits 751A, 751B through FC loops. In FIG. 11, the path of the FC loop is indicated by a bold arrow.

Figure 12:
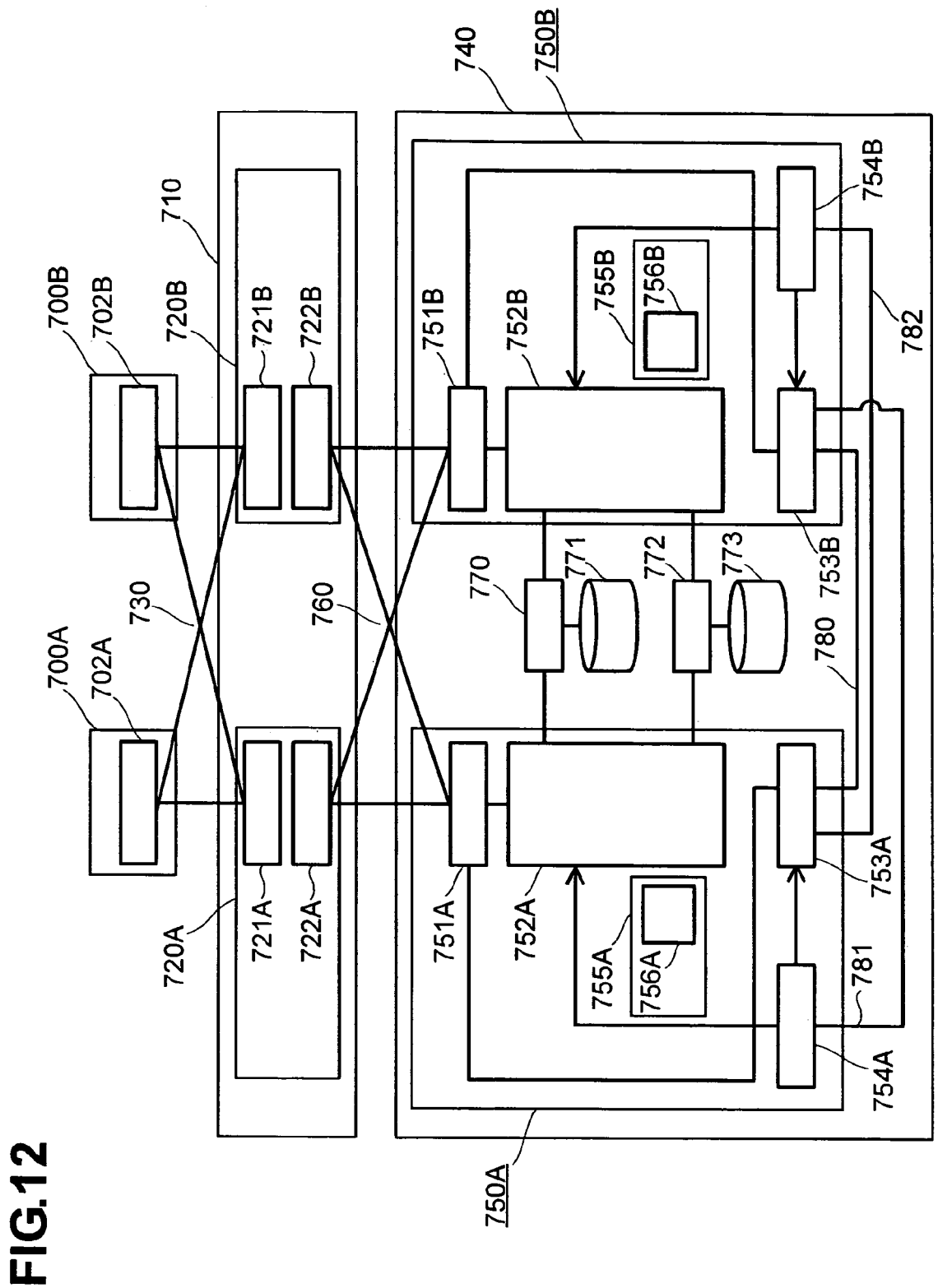
FIG. 12 is a view showing in detail structure of an expansion enclosure indicated in FIG. 11.

FIG. 12 is a view showing detailed structure of the expansion enclosure shown in FIG. 11. Structure of each of other expansion enclosures 760, 780 shown in FIG. 11 is similar to that of the expansion enclosure 740 as shown in FIG. 12. The expansion enclosure 740 has disk drives 771, 773 which are SATA drives. The drive controller is dual-structured, i.e., comprises a first drive controller 750A and a second drive controller 750B. The first drive controller 750A is a controller for controlling the drive enclosure, i.e., drive controller, and has a first port bypass circuit 751A, a first interface connector 752A, and a first enclosure management processor 753A.

On the drive controller of the expansion enclosure 740 is mounted an intelligent semiconductor chip (processor). This means that the system has two command channels, namely, one originating from the system controller of the master enclosure and the other from the drive controller of the expansion controller. Accordingly, in the event of occurrence of an error at the interface connector of the drive controller, there may be caused an unexpected crash of the chip or malfunction thereof due to a latent bug, since the chip is intelligent. To prevent an influence of the malfunction on the whole system, the failed drive is reset or powered off to be completely shut down. Thus the possible malfunction is prevented.

The first interface connector 752A of the first drive controller 750A has a function to convert data of FC format which is transmitted on the FC loop, into SATA format. The same applies to the second drive controller 750B. The first and second enclosure management processor 753A, 753B is a processor for monitoring and managing the status of the drive enclosure 740 (e.g., power failure, abnormal temperature, and abnormal path). The first and second enclosure management processors 753A, 753B are connected via an exclusive line 780 to send respective management information to each other. The first and second enclosure management processors 753A, 753B are respectively connected to the first and second port bypass circuits 751A, 751B, and are assigned with respective FC–AL addresses.

The SATA drive comprises 771, 773 and dual port circuits (dual port devices) or DPDs 770, 772. The dual port circuit or DPDs 770, 772 has a function to switch the access path to the disk 771, 773 between the first interface connector 752A of the first drive controller 750A and the second interface connector 752B of the second drive controller 750B. In other words, the dual port circuit 770, 772 has a function to connect one of a data line from the first interface connector 752A of the first drive controller 750A and a data line from the second interface connector 752B of the second drive controller 750B to the disk 771, 773.

The first and second port bypass circuits 751A, 751B are circuits for switching the path (or data line). However, these circuits do not perform the switching of the path for themselves, but implement it in response to an instruction from the system controller 720A, 720B. The system controller 720A has a structure as shown in FIG. 7, for instance.

The path of the FC loop shown in FIG. 11 indicates an access path between the master enclosure and expansion enclosures 740, 760, 780, when the system does not suffer from any fault. Although the number of the expansion enclosures is not limited to three, the case where only three of them are connected is described here for simplifying illustration. At the last expansion enclosure which is not connected to another expansion enclosure any further, the FC cable turns back at the port bypass circuit 791A, as pointed by an arrow A in FIG. 11. Although FIG. 11 shows only one of the FC loops on the side of the system controller 720A of the master enclosure 710, the other loop on the side of the system controller 720B operates similarly.

In the normal state, first drive controllers 750A, 770A, 790A of the respective expansion enclosures 740, 760, 780 are connected by the FC loop as shown in FIG. 11. The path originates from the path switch 722A of the system controller 720A of the master enclosure 710 and enters into the first interface connector 752A via the port bypass circuit 751A of the first drive controller 750A of the expansion enclosure 740, so that read/write operations of data (communicated from and to the host computer 700A or 700B) from and to the disk drive, which is the SATA drive connected to the first interface connector 752A via a dual port circuit (not shown), are executed. The expansion enclosures 760, 780 are also similarly connected through the FC loop. Thus there is provided a SATA disk array system where components are connected by a dual FC loop as a whole.

[Third Embodiment]

Figure 13:
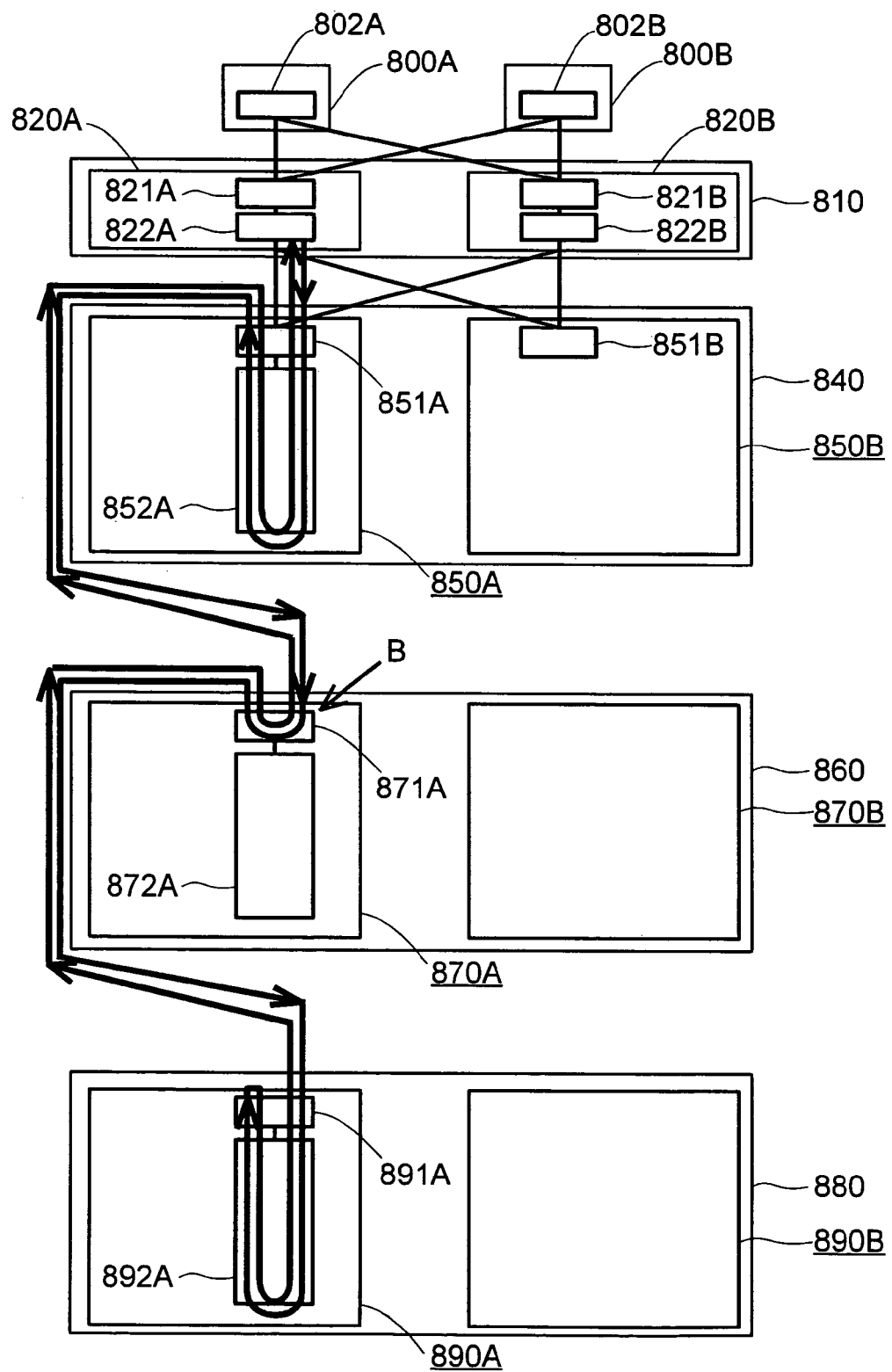
FIG. 13 is a functional block diagram illustrating a disk array system according to a third embodiment of the invention.

FIG. 13 is a functional block diagram illustrating structure of a disk array system according to a third embodiment of the invention. Elements corresponding to the same elements shown in FIG. 11 are referred to by reference numerals in the 800 range. In the description of the third embodiment, there will be described a case where a fault occurs in the disk array system comprising a master enclosure 810 and a plurality of expansion enclosures 840, 860, 880. Detailed structure of the expansion enclosure 840, 860, 880 . . . is similar to that of the enclosure 740 shown in FIG. 12; the reference numerals in the 700 range are to be replaced by reference numerals in the 800 range in the third embodiment shown in FIG. 13.

Figure 14:
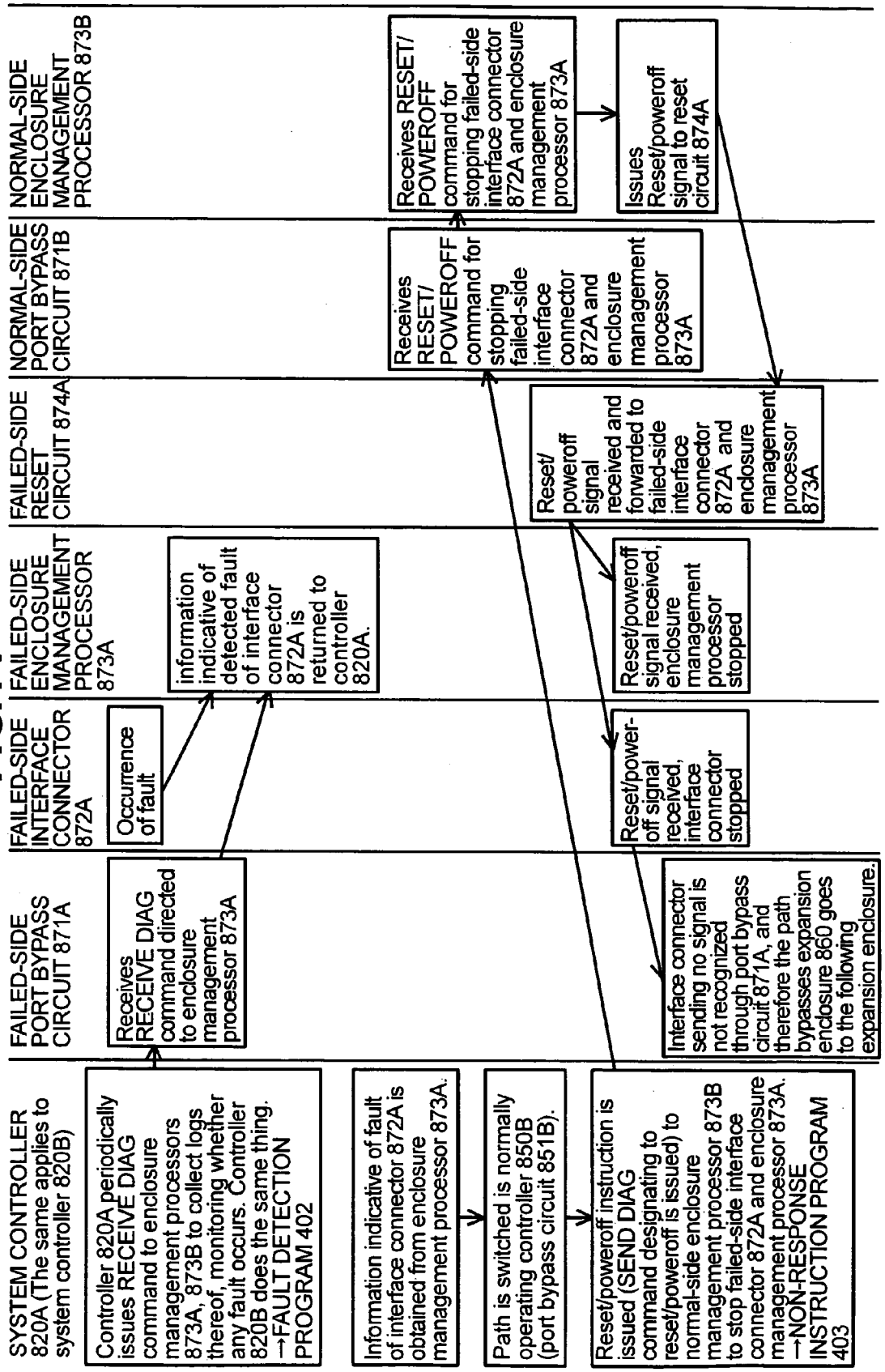
FIG. 14 is a flow chart illustrating operation of the system shown in FIG. 13.

FIG. 14 is a flow chart illustrating operation of the system shown in FIG. 13. In FIG. 14 is indicated from left to right respective operations of: the system controller 820A (820B); failed-side port bypass circuit 871A; failed-side interface connector 872A; failed-side enclosure management processor 873A; failed-side reset circuit 874A; normal-side port bypass circuit 871B; and normal-side enclosure management processor 873B.

Here is illustrated by reference to the flow chart of FIG. 14 a control of bypassing failed enclosure, in the event of a fault on the side of the first drive controller 870A of the expansion enclosure 860 in the system shown in FIG. 13.

(1) The system controller 820A periodically issues a RECEIVE DIAG command to each drive controller 850A, 850B, 870A, 870B, 890A, 890B of the expansion enclosures 840, 860, 880 to collect a log of the enclosure management processor of the each drive controller, according to the fault detection program 402, for thereby monitoring whether any fault occurs. The controller 820B operates similarly.

(2) A fault occurs at the first interface connector 872A of the expansion enclosure 860.

(3) The port bypass circuit 871A receives the RECEIVE DIAG command from the system controller 820A.

When the enclosure management processor 873A on the failed-side has detected the occurrence of the fault at the interface connector 872A via the port bypass circuit 871A, this fault information is returned to the system controller 820A in response to the RECEIVE DIAG command.

The system controller 820A obtains the fault information indicative of the occurrence of the fault at the interface connector 872A from the enclosure management processor 873A. The path is switched to the normally operating controller 850B. A reset/poweroff instruction is issued to the normal-side enclosure management processor 873B to stop or shut down the failed-side interface connector 872A and enclosure management processor 873A, according to the non-response instruction program 403.

The normal-side port bypass circuit 871B receives a RESET/POWEROFF command for stopping or shutting down the failed-side interface connector 872A and enclosure management processor 873A.

The normal-side enclosure management processor 873B receives the RESET/POWEROFF command for stopping or shutting down the failed-side interface connector 872A and enclosure management processor 873A, and issues a reset/poweroff signal to the reset circuit 874A.

The failed-side reset circuit 874A receives the reset/poweroff signal and transfers the reset/poweroff signal to the failed-side interface connector 872A and enclosure management processor 873A.

The failed-side enclosure management processor 873A receives the reset/poweroff signal and shuts down the enclosure management processor 873A.

The failed-side interface connector 872A also receives the reset/poweroff signal and shuts down the interface connector 872A.

The interface connector becomes incapable of being recognized through the port bypass circuit 871A, and therefore the path bypasses the drive controller 870A and goes to the following expansion enclosure 880.

According to the third embodiment where the port bypass circuit (PBC) is provided at the port of each enclosure and it is controlled such that the path bypasses the failed drive controller 870A and goes to the following expansion enclosure 880 as pointed by the arrow B in FIG. 13, the operation of the system as a whole can be continued without closing the FC loop, minimizing influence of the fault on the system.

Further, according to the third embodiment where the enclosure management processors are employed, a fault occurring in a SATA expansion enclosure can be quickly dealt with. Still further, since the system controller can read and write data from and to the SATA drive via the FC loop, PBC and interface connector, a control of a large volume of data can be enabled in the disk array system. Still further, since the plurality of system controllers is connected to the SATA expansion enclosure via the plurality of FC loops, a highly fault-tolerant disk array system can be provided.

[Fourth Embodiment]

Figure 15:
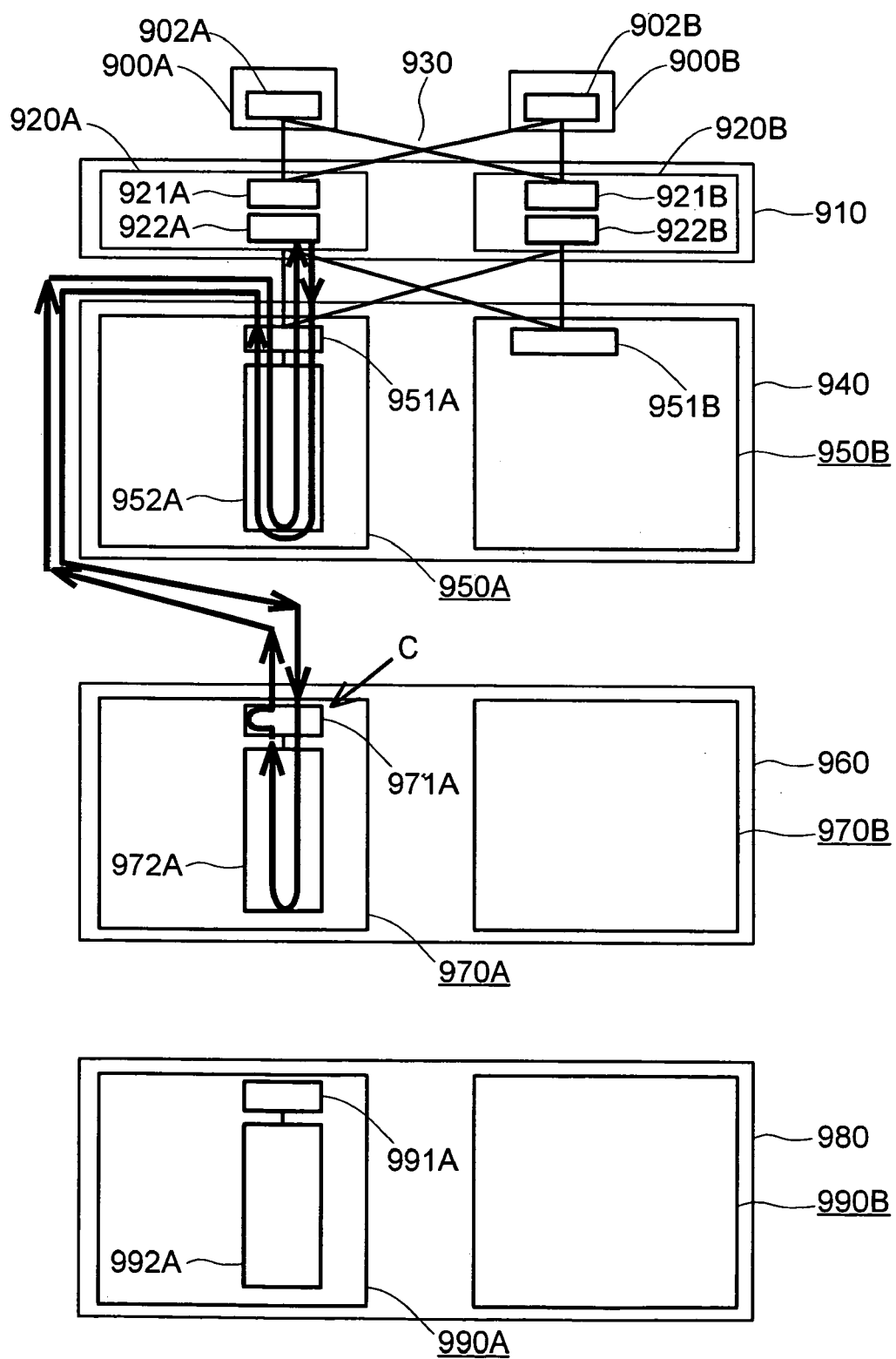
FIG. 15 is a functional block diagram illustrating a disk array system according to a fourth embodiment of the invention.
Figure 16:
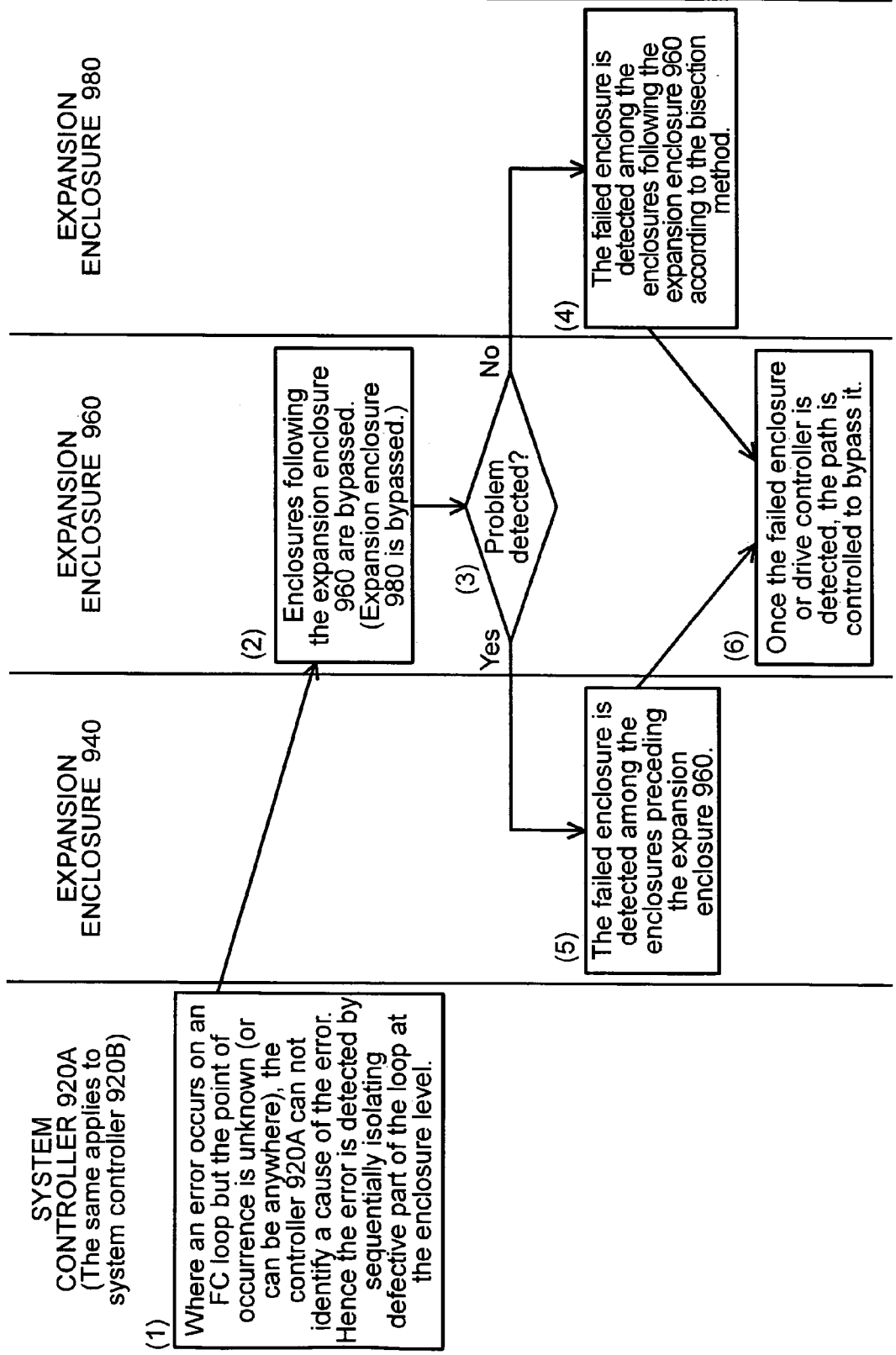
FIG. 16 is a flow chart illustrating operation of the system shown in FIG. 15.

FIG. 15 is a functional block diagram illustrating structure of a disk array system according to a fourth embodiment of the invention. Elements corresponding to the same elements shown in FIG. 13 are referred to by reference numerals in the 900 range. FIG. 15 shows a state where an abnormality has occurred in the disk array system comprising a master enclosure 910 and a plurality of expansion enclosures 940, 960, 980. Detailed structure of each expansion enclosure 940, 960, 980 . . . is similar to that of the expansion enclosure 740 as shown in FIG. 12. The reference numerals in the 700 range in FIG. 12 are to be replaced by reference numerals in the 900 range in FIG. 15. For simplification, here is illustrated a case where only three expansion enclosures are provided and control instructions are issued by a system controller 920A of a master enclosure 910 (a system controller 920B operates similarly to the system controller 920A). FIG. 16 is a flow chart illustrating operation of the system shown in FIG. 15. The fourth embodiment relates to a method of controlling isolation of a failed component, which may be called "latter-part bypass" method, and which is used in the event of occurrence of a fault in the disk array system to identify the expansion enclosure where the fault has occurred. There will be described a way of identifying a failed enclosure according to the latter-part bypass method according to the fourth embodiment, by reference to FIG. 16.

(1) In a case where an error occurs on an FC loop but the location where the error occurs is unknown (or can be anywhere), the controller 920A of the master enclosure 910 can not identify the location of the error. Hence the error is detected at the enclosure level by sequentially isolating defective part of the loop. Here, the latter half of the plurality of expansion enclosures on the loop is first bypassed. If the system operates normally in this state, then the latter half of the first bypassed latter half is sequentially bypassed, that is, isolated from the FC loop. In this example, the expansion enclosure 980 is bypassed.

(2) The expansion enclosure 960 and the following enclosures are bypassed at the port bypass circuit 971A of the expansion enclosure 960 as pointed by the arrow C. By this bypassing, an FC loop on which the master enclosure 910, expansion enclosures 940 and 960 are operating is formed.

(3) It is determined whether any problem is detected with regard to operation on the FC loop (i.e., presence/absence of an error is determined).

(4) If it is determined that there is no problem detected, the error is searched according to the bisection method. Namely, the expansion enclosure of the latter half, i.e. the expansion enclosure 980 in this example, is bypassed. Although in FIG. 15 is shown only three expansion enclosures, a greater number of expansion enclosures are actually disposed in the system and the FC loop is further sequentially bypassed according to the bisection method, and it is determined whether any problem is detected regarding the operation of the FC loop in the current bypassed state each time the bypassing is implemented.

(5) On the other hand, if it is determined that there is a problem detected with regard to the operation of the FC loop, in the determination as to the presence/absence of the error in the step (3), the first half of the expansion enclosures is subject to the latter-half bypassing according to the bisection method to search the location of the error. Here again is noted that, as described with respect to the step (4), although there is shown only three expansion enclosures, a greater number of expansion enclosures are actually disposed in the system and the FC loop is further sequentially bypassed according to the bisection method, and it is determined whether any problem is detected regarding the operation of the FC loop in the current bypassed state each time bypassing is implemented.

(6) When an enclosure or drive controller where the error has occurred is detected in the error search in the latter half in the step (4) or in the first half in the step of (5), the failed element is bypassed.

Bypassing the failed enclosure where the error has occurred by the error search according to the latter-half bypass method enables the disk array system as a whole to continue to transmit and receive data to and from the higher-level device.

According to the fourth embodiment, since the enclosure management processors are provided, a fault occurring in the SATA expansion enclosure can be quickly dealt with. Further, since the system controller can read and write data from and to the SATA drive via the FC loop, PBC and interface connector, a control of a large volume of data can be enabled in the disk array system. Still further, since the plurality of system controllers is connected to the SATA expansion enclosure via the plurality of FC loops, a highly fault-tolerant disk array system can be provided.

Although there has been specifically described the present invention based on the embodiments thereof, it is to be understood that, as mentioned above, the invention is not limited to the details of the embodiments but may be embodied with various modifications without departing from the scope and spirit of the invention. For instance, although there has been described for illustrative purposes a storage system as one example of information processing system to which the invention is applied, the invention is widely applicable; for example, the invention may be applied to a general information processing system where components are connected by looped communication means such as a Fibre Channel loop.

As described above, the invention provides a disk array system exhibiting an improved reliability, which is equipped with looped communication means and need not stop read/write operations when an error occurs. Further, in an information processing system equipped with an FC looped communication means according to the invention, an expansion enclosure where a fault occurs is isolated from the loop, thereby enabling implementation of a quick and accurate recovery operation.

What is claimed is:

1. A disk array system comprising:
a controller enclosure;
one or more serial disk drive enclosures; and
a plurality of fibre channel loops respectively connecting the controller enclosure and the plurality of serial disk drive enclosures,
wherein the controller enclosure comprises:
a communication controller connected to a higher-level device and receives a data from the higher-level device,
a cache memory which is connected to the communication controller and which holds the data communicated between the communication controller and the higher-level device, and
a plurality of system controllers each being connected to the higher-level device and the cache memory and which controls to transfer or receive the data communicated between the higher-level device and the communication controller to and from the communication controller,
wherein each of the one or more serial disk drive enclosures comprises:
a plurality of port bypass circuits each of which is connected to the fiber channel loops and used to switch a connection of the serial disk drive enclosures of its own to the controller enclosure,
a plurality of interface connectors which are connected to the plurality of system controllers through the plurality of fibre channel loops, and each of which connects a fiber channel interface which is used by the plurality of fibre channel loops and an interface for serial disk drives,
a plurality of dual port circuits which are connected to the plurality of interface connectors, respectively, and controls to switch a path to the serial disk drive from the plurality of interface connectors,
a plurality of serial disk drives which are connected to the plurality of port bypass circuits, receives and stores the data transferred from the system controllers via the fibre channel loops, the port bypass circuits, the interface connectors, and the dual port circuits, and
an enclosure management processor which is connected to the plurality of interface connectors via the port bypass circuits, and monitors operation of the interface connectors,
wherein when one of said system controllers receives information concerning a fault occurring in one of said serial disk enclosures, said one of said system controllers bypasses the one of the serial disk enclosures in which the fault occurred by use of one of the port bypass circuits included in the one of the serial disk enclosures, and
wherein said bypassing the one of the serial disk enclosures in which the fault occurred by use of one of the port bypass circuits included in the one of the serial disk enclosures includes:
issuing by said one of said system controllers a RECEIVE DIAG command to each of the one or more serial disk drive enclosures to collect a log of the enclosure management processor of each serial disk drive enclosure, thereby monitoring whether any fault occurs,
receiving by the port bypass circuit, included in the one of the serial disk enclosures in which the fault occurred, the RECEIVE DIAG command and upon detection of an occurrence of a fault, transmitting fault information to said one of said system controllers,
upon receiving the fault information by said one of said system controllers, switching a path from the one of the serial disk enclosures in which the fault occurred by use of the port bypass circuit to another one of the serial disk enclosures in which a failure has not occurred, issuing a reset/poweroff instruction to the one of the serial disk enclosures in which the fault occurred to stop or shut down the one of the serial disk enclosures in which the fault occurred, and
receiving, by the one of the serial disk enclosures in which the fault occurred, the reset/poweroff instruction and shutting down the one of the serial disk enclosures in which the fault occurred.

2. The disk array system according to claim 1, wherein each of the system controllers has a path switcher which switches the fibre channel loop from one of the serial disk drives to the other of the serial disk drives.

3. The disk array system according to claim 1, wherein each of the serial disk drives of each of the one or more serial disk drive enclosures has said interface connector which converts a data on the fibre channel loop.

4. The disk array system according to claim 3, wherein each of the serial disk drives of each of the one of more of serial disk drive enclosures has said enclosure manager which manages the interface connector of the serial disk drives via the port bypass circuit.

5. The disk array system according to claim 4, wherein each of the serial disk drives of each of the one or more serial disk drive enclosures has a port bypass circuit which switches a connection of one or the other of the two system controllers to one or the other of ports of the interface connectors.

6. The disk array system according to claim 5, wherein the serial disk drive of each of the one or more serial disk drive enclosures has a dual port circuit which switches a connection thereof between the interface connectors.

7. The disk array system according to claim 5, wherein the enclosure managers of the respective serial disk drives of each of the one or more serial disk drive enclosures are connected to each other through an exclusive line.

8. The disk array system according to claim 6, wherein each of the serial disk drives of each of the one or more serial disk drive enclosures has a reset generator which resets or powers off at least one of the enclosure manager and the interface connector of one of the enclosure managers via the port bypass circuit in accordance with an instruction from the other of the enclosure manager.

9. A fault-tolerant control method for a disk array system comprising:
a controller enclosure;
one or more serial disk drive enclosures;
a plurality of fibre channel loops respectively connecting the controller enclosure and the one or more serial disk drive enclosures,
wherein the controller enclosure comprises:
a communication controller connected to a higher-level device and receives a data from the higher-level device,
a cache memory which is connected to the communication controller and which holds the data communicated between the communication controller and the higher-level device, and
a plurality of system controllers which is connected to the higher-level device and the cache memory and which controls to transfer or receive the data communicated between the higher-level device and the communication controller, to and from the communication controller,
wherein each of the one or more serial disk drive enclosures comprises:
a plurality of port bypass circuits each of which is connected to the fiber channel loops and used to switch a connection of each of the one or more serial disk drive enclosures of its own to the controller enclosure,
a plurality of interface connectors which is connected to the plurality of system controllers through the plurality of fibre channel loops, and which connects a fiber channel interface which is used by the plurality of fibre channel loops and an interface for serial disk drives,
a plurality of dual port circuits which is connected to the plurality of interface connectors and controls to switch a path to the serial disk drive from the plurality of interface connectors,
a plurality of serial disk drives which is connected to the plurality of port bypass circuits, receives and stores the data transferred from the system controllers via the fibre channel loops, the port bypass circuits, the interface connectors, and the dual port circuits, and
an enclosure management processor which is connected to the plurality of interface connectors via the port bypass circuits, and monitors operation of the interface connectors,
wherein the enclosure management processor communicates with another enclosure management processor, and notifies the system controller of an occurrence of a fault at the interface connector monitored by the another enclosure management processor upon recognizing the occurrence, thereby having the system controller shut down operation of the failed interface connector via the port bypass circuit, wherein when one of said system controllers receives information concerning a fault occurring in one of said serial disk enclosures, said one of said system controllers bypasses the one of the serial disk enclosures in which the fault occurred by use of one of the port bypass circuits included in the one of the serial disk enclosures, and
wherein said bypassing the one of the serial disk enclosures in which the fault occurred by use of one of the port bypass circuits included in the one of the serial disk enclosures includes:
issuing by said one of said system controllers a RECEIVE DIAG command to each of the one or more serial disk drive enclosures to collect a log of the enclosure management processor of each serial disk drive enclosure, thereby monitoring whether any fault occurs,
receiving by the port bypass circuit, included in the one of the serial disk enclosures in which the fault occurred, the RECEIVE DIAG command and upon detection of an occurrence of a fault, transmitting fault information to said one of said system controllers,
upon receiving the fault information by said one of said system controllers, switching a path from the one of the serial disk enclosures in which the fault occurred by use of the port bypass circuit to another one of the serial disk enclosures in which a failure has not occurred, issuing a reset/poweroff instruction to the one of the serial disk enclosures in which the fault occurred to stop or shut down the one of the serial disk enclosures in which the fault occurred, and
receiving, by the one of the serial disk enclosures in which the fault occurred, the reset/poweroff instruction and shutting down the one of the serial disk enclosures in which the fault occurred.

10. The fault-tolerant control method according to claim 9, wherein each of the serial disk drives of each of the one or more serial disk drive enclosures is connected to a port bypass circuit which switches a connection of one or the other of the system controllers between one or the other of ports of the interface connector, and
wherein the switching of the fibre channel loop is performed by the port bypass circuits.

11. The fault-tolerant control method according to claim 9, wherein the serial disk drive of each of the one or more serial disk drive enclosures has a dual port circuit which switches a connection thereof between the interface connectors, and the switching is performed by the port bypass circuit.

12. The fault-tolerant control method according to claim 9, wherein the serial disk drive of each of the one or more serial disk drive enclosures has a reset generator which resets or powers off at least one of the said one enclosure manager and the interface connector in accordance with an instruction from the other enclosure manager, and
wherein the resetting or powering off of the interface connector by the reset generator is implemented via the port bypass circuit.

13. The fault-tolerant control method according to claim 9, wherein the enclosure managers of the serial disk drive of each of the one or more serial disk drive enclosures are connected to each other through an exclusive line, and the said one enclosure manger notifies the other enclosure manager of the occurrence of the fault at the interface connector of the one enclosure manager, via the exclusive line.

14. The fault-tolerant control method according to claim 13, wherein the reset generator also shuts down the one enclosure manager which manages the interface connector which is shut down by the reset generator.

15. A disk array system comprising:
a controller enclosure;
one or more serial disk drive enclosures; and
a plurality of fibre channel loops respectively connecting the controller enclosure and the plurality of serial disk drive enclosures,
wherein the controller enclosure comprises:
a communication controller connected to a higher-level device and receives a data from the higher-level device,
a cache memory which is connected to the communication controller and which holds the data communicated between the communication controller and the higher-level device, and
a plurality of system controllers each being connected to the higher-level device and the cache memory and which controls to transfer or receive the data communicated between the higher-level device and the communication controller to and from the communication controller,
wherein each of the one or more serial disk drive enclosures comprises:
a plurality of port bypass circuits each of which is connected to the fiber channel loops and used to switch a connection of the serial disk drive enclosures of its own to the controller enclosure,
a plurality of interface connectors which are connected to the plurality of system controllers through the plurality of fibre channel loops, and each of which connects a fiber channel interface which is used by the plurality of fibre channel loops and an interface for serial disk drives,
a plurality of dual port circuits which are connected to the plurality of interface connectors, respectively, and controls to switch a path to the serial disk drive from the plurality of interface connectors,
a plurality of serial disk drives which are connected to the plurality of port bypass circuits, receives and stores the data transferred from the system controllers via the fibre channel loops, the port bypass circuits, the interface connectors, and the dual port circuits, and
an enclosure management processor which is connected to the plurality of interface connectors via the port bypass circuits, and monitors operation of the interface connectors,
wherein when an error occurs on one of said fibre channel loops and an exact location of said error is unknown, one of the system controllers which received information concerning said error detects the location of said error by sequentially isolating parts of one of said fibre channel loops at the enclosure level until the part within which said error occurred is located,
wherein when one of said system controllers receives information concerning a fault occurring in one of said serial disk enclosures, said one of said system controllers bypasses the one of the serial disk enclosures in which the fault occurred by use of one of the port bypass circuits included in the one of the serial disk enclosures, and
wherein said bypassing the one of the serial disk enclosures in which the fault occurred by use of one of the port bypass circuits included in the one of the serial disk enclosures includes:
issuing by said one of said system controllers a RECEIVE DIAG command to each of the one or more serial disk drive enclosures to collect a log of the enclosure management processor of each serial disk drive enclosure, thereby monitoring whether any fault occurs,
receiving by the port bypass circuit, included in the one of the serial disk enclosures in which the fault occurred, the RECEIVE DIAG command and upon detection of an occurrence of a fault, transmitting fault information to said one of said system controllers,
upon receiving the fault information by said one of said system controllers, switching a path from the one of the serial disk enclosures in which the fault occurred by use of the port bypass circuit to another one of the serial disk enclosures in which a failure has not occurred, issuing a reset/poweroff instruction to the one of the serial disk enclosures in which the fault occurred to stop or shut down the one of the serial disk enclosures in which the fault occurred, and
receiving, by the one of the serial disk enclosures in which the fault occurred, the reset/poweroff instruction and shutting down the one of the serial disk enclosures in which the fault occurred.

* * * * *